US008988584B2

(12) United States Patent  
Shintani et al.

(10) Patent No.: US 8,988,584 B2  
(45) Date of Patent: Mar. 24, 2015

(54) IMAGING APPARATUS

(75) Inventors: Dai Shintani, Osaka (JP); Kenichi Honjo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 964 days.

(21) Appl. No.: 13/083,127

(22) Filed: Apr. 8, 2011

(65) Prior Publication Data

US 2011/0249150 A1 Oct. 13, 2011

(30) Foreign Application Priority Data

Apr. 9, 2010 (JP) ................................ 2010-090327

(51) Int. Cl.  
H04N 5/222 (2006.01)  
H04N 5/232 (2006.01)  
G03B 13/00 (2006.01)

(52) U.S. Cl.  
CPC ............................... *H04N 5/23212* (2013.01)  
USPC ..................................... 348/345; 348/333.01

(58) Field of Classification Search  
USPC ............... 348/345, 240, 349, 333.01–333.13  
See application file for complete search history.

(56) References Cited

U.S. PATENT DOCUMENTS

| 4,933,700 | A   | 6/1990 | Ikeda et al. |         |
|-----------|-----|--------|--------------|---------|
| 6,781,632 | B1* | 8/2004 | Ide ............................... | 348/345 |
| 2002/0122121 | A1  | 9/2002 | Fujii et al. |         |
| 2004/0189857 | A1* | 9/2004 | Hirai ............................... | 348/345 |
| 2005/0052564 | A1* | 3/2005 | Ishii ............................... | 348/345 |
| 2008/0036902 | A1  | 2/2008 | Tanaka |         |
| 2008/0131019 | A1* | 6/2008 | Ng ............................... | 382/255 |
| 2009/0002543 | A1* | 1/2009 | Tomita et al. ............... | 348/345 |
| 2009/0015703 | A1* | 1/2009 | Kim et al. .............. | 348/333.12 |

FOREIGN PATENT DOCUMENTS

| JP | 2-134607 | 5/1990 |
|----|----------|--------|
| JP | 2000-249903 | 9/2000 |
| JP | 2002-209134 | 7/2002 |
| JP | 2003-121731 | 4/2003 |
| JP | 2008-187231 A | 8/2008 |
| JP | 2008-311886 A | 12/2008 |

* cited by examiner

*Primary Examiner* — Kelly L Jerabek  
*Assistant Examiner* — Tuan Le  
(74) *Attorney, Agent, or Firm* — McDermott Will & Emery LLP

(57) ABSTRACT

A camera includes an imaging device; a phase difference detection unit configured to, in parallel with receipt of the light from the subject by the imaging device, perform phase difference detection using the light to detect a defocus amount of the subject; a focus lens group; a body control section configured to move the focus lens group based on the defocus amount detected by the phase difference detection unit to bring the subject into focus; and an image display section for selecting a subject to be in focus from subjects included in an image signal. The body control section is configured to, when the subject to be in focus is selected, move the focus lens group to bring the selected subject into focus. The body control section adjusts a focusing time depending on the defocus amount detected before the movement of the focus lens group.

13 Claims, 13 Drawing Sheets

IMAGING APPARATUS

CROSS-REFERENCE TO RELATED APPLICATION

This application claims priority to Japanese Patent Application No. 2010-090327 filed on Apr. 9, 2010, the disclosure of which including the specification, the drawings, and the claims is hereby incorporated by reference in its entirety.

BACKGROUND

A technique disclosed herein relates to an imaging apparatus including a focus detection section configured to detect a defocus amount of a subject by performing phase difference detection, and particularly relates to an imaging apparatus by which a motion image can be shot.

Recently, a digital camera (camera including camcorders and still cameras) in which imaging devices such as a charge coupled device (CCD) image sensor, a complementary metal-oxide semiconductor (CMOS) sensor, etc. are used to convert a subject image into an electrical signal, and such an electrical signal is converted into a digital form and is recorded has widespread application. The digital camera of this type may be configured so that a region corresponding to an imaging surface of the imaging device includes a plurality of different focus detection areas, and a defocus amount of a subject in each of the focus detection areas can be detected.

An imaging apparatus described in, e.g., Japanese Patent Publication No. 2000-249903 includes seven different focus detection areas in a region corresponding to an imaging surface of an imaging device. The imaging apparatus is configured to be switchable between a mode in which the focus detection area used for auto-focusing (hereinafter referred to as "AF") is automatically selected from the seven focus detection areas, and a mode in which one of the seven focus detection areas, which is selected by a photographer is used to perform the AF. In the imaging apparatus of Japanese Patent Publication No. 2000-249903, an acceptable focusing range is increased in the mode in which the focus detection area is automatically selected, thereby shortening a focusing time.

SUMMARY

Conventionally, the shortening of the focusing time has been required, and a variety of techniques have been developed. One of the techniques is the imaging apparatus of Japanese Patent Publication No. 2000-249903. However, the short focusing time is not necessarily beneficial for shooting a motion image. For example, high-speed focusing while a subject in focus is changed provides discomfort such as a feeling of restlessness, a feeling of haste, etc. to a viewer. In addition, even when the photographer wishes low-speed focusing, the imaging apparatus cannot shoot an image by such low-speed focusing. That is, an image which satisfies a photographer's purpose for shooting cannot be shot.

The present disclosure has been made in view of the foregoing, and it is an objective of the present disclosure to provide an imaging apparatus in which discomfort provided to a user during focusing can be reduced or prevented, and an image which satisfies a user's purpose for shooting can be shot.

An imaging apparatus disclosed herein includes an imaging device configured to convert light from a subject into an electrical signal by photoelectric conversion and generate an image signal; a focus detection section configured to, in parallel with receipt of the light from the subject by the imaging device, receive a part of the light from the subject to perform phase difference detection using the light, and detect a defocus amount of the subject; a focus lens configured to adjust a focus position; a control section configured to move the focus lens based on the defocus amount detected by the focus detection section to bring the subject into focus; and a selecting unit for selecting a subject to be in focus from subjects included in an image signal. The control section is configured to, when a predetermined condition for shifting focus is satisfied, move the focus lens to bring the subject selected by the selecting unit into focus, and adjusts a focusing time from the satisfaction of the condition for shifting focus to the achievement of the focusing depending on the defocus amount detected by the focus detection section before the movement of the focus lens.

According to the imaging apparatus, since the focusing time required for bringing the subject to be subsequently in focus into focus can be adjusted depending on the defocus amount, the discomfort provided to the user during the focusing can be reduced or prevented, and the image which satisfies the user's purpose for shooting can be shot. That is, the conventional imaging apparatus places importance on shortening the focusing time. Such an image apparatus quickly brings the subject into focus at any time, and therefore the focusing time cannot be adjusted. On the other hand, the imaging apparatus of the present disclosure can adjust the focusing time. Thus, the focusing time can be extended at one time, and can be shortened at other times. Consequently, the discomfort provided to the user can be reduced or prevented, and the image which satisfies the user's purpose for shooting can be shot.

DETAILED DESCRIPTION

Example embodiments will be described below in detail with reference to the drawings.

Embodiment

Figure 1:
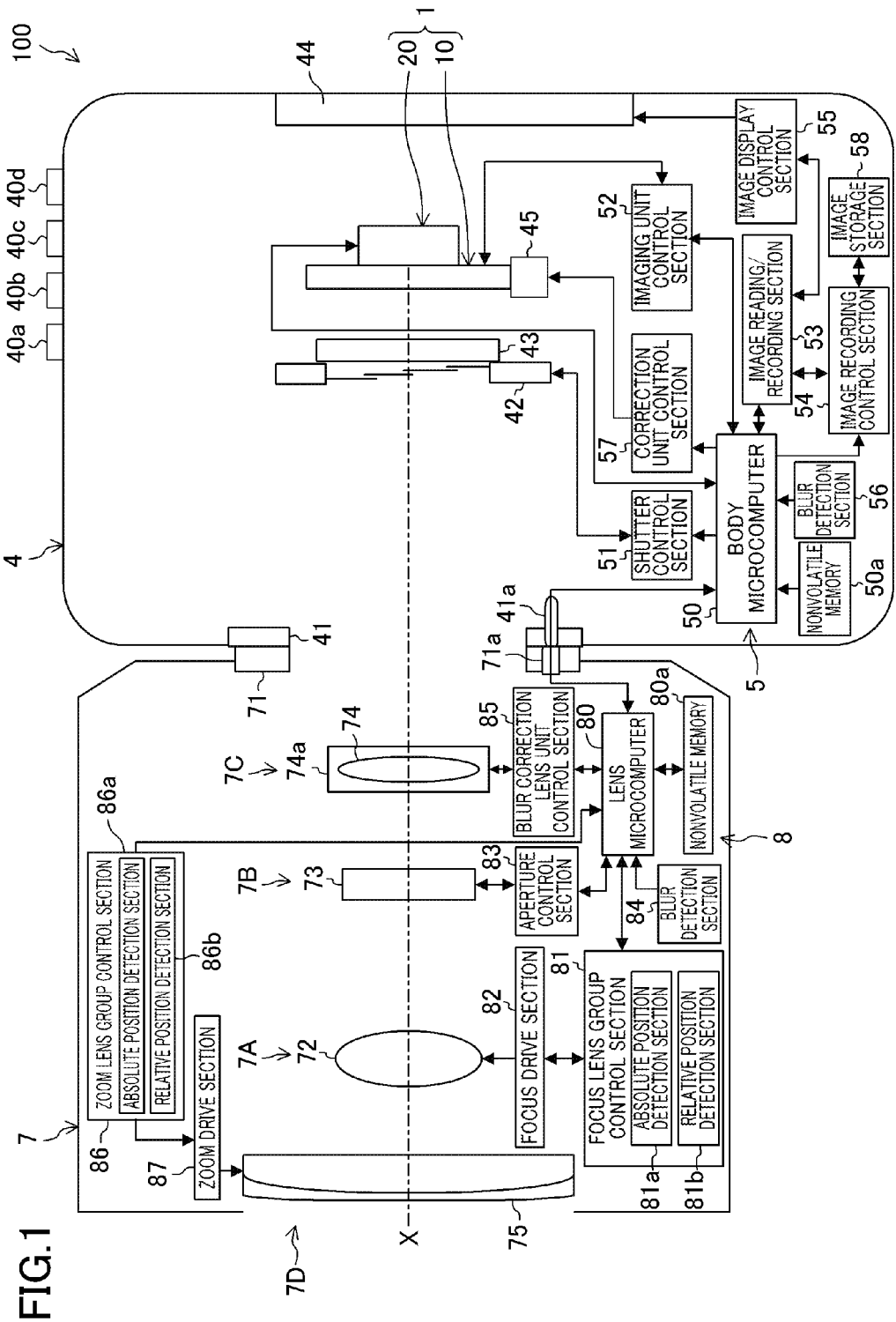
FIG. 1 is a block diagram of a camera of an embodiment.

As illustrated in FIG. 1, a camera 100 of the present embodiment is an interchangeable lens type digital single-lens reflex camera. As major components, the camera 100 includes a camera body 4 having main functions of a camera system, and an interchangeable lens 7 which is detachable from the camera body 4. The interchangeable lens 7 is attached to a body mount 41 provided on a front surface of the camera body 4. An electric contact piece 41a is provided in the body mount 41. The camera 100 forms an imaging apparatus.

Configuration of Camera Body

The camera body 4 includes an imaging unit 1 configured to capture a subject image as a shot image, a shutter unit 42 configured to adjust an exposure state of the imaging unit 1, an optical low pass filter (OLPF) 43 configured to remove infrared light of the subject image entering the imaging unit 1 and reduce the moire phenomenon, which also serves as an IR cutter, an image display section 44 configured to display a shot image, a live view image, and various information, which is formed by a liquid crystal monitor, and a body control section 5. The camera body 4 forms an imaging apparatus body.

In the camera body 4, the followings are also provided: a power switch 40a operated to turn ON/OFF the camera system, a release button 40b operated for focusing and releasing, a focus shift switch 40c operated to switch to a focus shift mode which will be described later, and an REC button 40d operated to start/stop recording a motion image in a motion image shooting mode.

When the power switch 40a turns ON the camera system, power is supplied to each section of the camera body 4 and the interchangeable lens 7.

The release button 40b is a two-stage switch. Auto-focusing, automatic exposure (AE), etc. are performed by pressing the release button 40b halfway down, and the releasing is performed by pressing the release button 40b all the way down.

The focus shift switch 40c is a direct switch (switch by which a desired mode can be directly set not at a plurality of operational steps but at a single operational step) to the later-described focus shift mode when shooting the motion image.

The REC button 40d is an operation member configured to receive operation input for starting/stopping the recording of the motion image in the motion image shooting mode which will be described later. By pressing the REC button 40d, the camera 100 starts recording the motion image. By pressing the REC button 40d again during the recording of the motion image, the camera 100 stops recording the motion image.

Needless to say, the switch and button 40c and 40d may be provided as options in a menu from which various camera shooting functions are selected.

Although will be described in detail later, the imaging unit 1 converts a subject image into the electrical signal by photoelectric conversion. The imaging unit 1 is movable in a plane perpendicular to an optical axis X by a blur correction unit 45.

A touch screen is provided in the image display section 44. The touch screen outputs an output signal corresponding to a user's operation. A user can perform an operation such as an operation to select information displayed in the image display section 44 etc. by operating the touch screen. The image display section 44 including the touch screen forms a selecting unit and a display unit.

The body control section 5 includes a body microcomputer 50, a nonvolatile memory 50a, a shutter control section 51 configured to control driving of the shutter unit 42, an imaging unit control section 52 configured to control the operation of the imaging unit 1 and to perform A/D conversion of an electrical signal from the imaging unit 1 to output the converted signal to the body microcomputer 50, an image reading/recording section 53 configured to read image data from, e.g., a card type recording medium or an image storage section 58 which is an internal memory and to record image data in the image storage section 58, an image recording control section 54 configured to control the image reading/recording section 53, an image display control section 55 configured to control displaying in the image display section 44, a blur detection section 56 configured to detect an amount of an image blur caused due to shaking of the camera body 4, and a correction unit control section 57 configured to control the blur correction unit 45. The body control section 5 forms a control section.

The body microcomputer 50 is a control device configured to control the main functions of the camera body 4, and controls various sequences. For example, a CPU, a ROM, and a RAM are mounted in the body microcomputer 50. Programs stored in the ROM are read by the CPU, and therefore the body microcomputer 50 can carry out various functions.

The body microcomputer 50 is configured to receive input signals from the power switch 40a, the release button 40b, the focus shift switch 40c, and the REC button 40d, and to output control signals to the shutter control section 51, the imaging unit control section 52, the image reading/recording section 53, the image recording control section 54, the correction unit control section 57, etc. In addition, the body microcomputer 50 commands each of the shutter control section 51, the imaging unit control section 52, the image reading/recording section 53, the image recording control section 54, the correction unit control section 57, etc. to carry out a corresponding control operation. Further, the body microcomputer 50 performs inter-microcomputer communication with a lens microcomputer 80 which will be described later.

For example, according to a command of the body microcomputer 50, the imaging unit control section 52 performs A/D conversion of an electrical signal from the imaging unit 1 to output the converted signal to the body microcomputer 50. The body microcomputer 50 performs predetermined image processing of the received electrical signal to generate an image signal. Then, the body microcomputer 50 transmits the image signal to the image reading/recording section 53, and commands the image recording control section 54 to record and display an image. As a result, the image signal is stored in the image storage section 58, and is transmitted to the image display control section 55. The image display control section 55 controls the image display section 44 based on the transmitted image signal, and the image is displayed in the image display section 44.

Although will be described in detail later, the body microcomputer 50 is configured to detect a subject point distance to a subject via the lens microcomputer 80.

Various pieces of information (device information) on the camera body 4 is stored in the nonvolatile memory 50a. The device information includes, e.g., model information (device specific information) specifying the camera body 4, such as information on a manufacturer's name, a manufacturing date, a model number of the camera body 4, version information on software installed in the body microcomputer 50, information on firmware update, etc.; information on whether or not the camera body 4 includes a unit configured to correct an image blur, such as the blur correction unit 45, the blur detection section 56, etc.; information on a model number and detection performance (e.g., sensitivity etc.) of the blur detection section 56; information on an error history. Note that such information may be stored in a memory section of the body microcomputer 50 instead of the nonvolatile memory 50a.

The blur detection section 56 includes an angular velocity sensor configured to detect movement of the camera body 4 due to a hand-induced camera shake etc. The angular velocity sensor outputs a positive/negative angular velocity signal depending on a direction in which the camera body 4 moves, with reference to output in a state in which the camera body 4 stands still. Note that, in the present embodiment, two angular velocity sensors are provided in order to detect two directions, i.e., a yawing direction and a pitching direction.

After filtering, amplification, etc., the output angular velocity signal is converted into a digital signal by an A/D conversion section, and is transmitted to the body microcomputer 50.

Configuration of Interchangeable Lens

The interchangeable lens 7 forms an optical imaging system configured to form a subject image on the imaging unit 1 of the camera body 4. As major components, the interchangeable lens 7 includes a focus adjustment section 7A configured to perform the focusing, an aperture adjustment section 7B configured to adjust an aperture, a lens image blur correction section 7C configured to adjust an optical path to correct an image blur, a zoom adjustment section 7D configured to perform zooming, and a lens control section 8 configured to control an operation of the interchangeable lens 7.

The interchangeable lens 7 is attached to the body mount 41 of the camera body 4 through a lens mount 71. An electric contact piece 71a electrically connected to the electric contact piece 41a of the body mount 41 when the interchangeable lens 7 is attached to the camera body 4 is provided in the lens mount 71.

The focus adjustment section 7A is formed by a focus lens group 72 configured to adjust focus. The focus lens group 72 is movable in a direction along the optical axis X in a section between a closest focus position and an infinite focus position, which is provided as a standard for the interchangeable lens 7. When a focus position is detected by a contrast detection method which will be described later, it is necessary that the focus lens group 72 is movable back and forth in the direction along the optical axis X relative to the focus position. Thus, the focus lens group 72 includes a lens shift margin section in which the focus lens group 72 is movable back and forth in the direction along the optical axis X beyond the section between the closest focus position and the infinite focus position.

Note that the focus lens group 72 does not necessarily include a plurality of lenses, and may includes a single lens.

The aperture adjustment section 7B is formed by an aperture section 73 configured to adjust an aperture size. The aperture section 73 forms a light amount adjustment section.

The lens image blur correction section 7C includes a blur correction lens 74, and a blur correction lens drive section 74a configured to move the blur correction lens 74 in the plane perpendicular to the optical axis X.

The zoom adjustment section 7D is formed by a zoom lens group 75 configured to adjust a zoom. The zoom lens group 75 is movable in the direction along the optical axis X in a section between a wide-angle position and a tele position, which is provided as the standard for the interchangeable lens 7. Note that the zoom lens group 75 does not necessarily include a plurality of lenses, and may include a single lens.

The lens control section 8 includes the lens microcomputer 80, a nonvolatile memory 80a, a focus lens group control section 81 configured to control an operation of the focus lens group 72, a focus drive section 82 configured to receive a control signal from the focus lens group control section 81 to drive the focus lens group 72, an aperture control section 83 configured to control an operation of the aperture section 73, a blur detection section 84 configured to detect a blur of the interchangeable lens 7, a blur correction lens unit control section 85 configured to control the blur correction lens drive section 74a, a zoom lens group control section 86 configured to control an operation of the zoom lens group 75, and a zoom drive section 87 configured to receive a control signal from the zoom lens group control section 86 to drive the zoom lens group 75.

The lens microcomputer 80 is a control device configured to control main functions of the interchangeable lens 7, and is connected to each section mounted in the interchangeable lens 7. Specifically, a CPU, a ROM, and a RAM are mounted in the lens microcomputer 80. Programs stored in the ROM are read by the CPU, and therefore the lens microcomputer 80 can carry out various functions. For example, the lens microcomputer 80 has a function to set a lens image blur correction system (the blur correction lens drive section 74a etc.) to a correction executable state or a correction inexecutable state based on a signal from the body microcomputer 50. Due to contact of the electric contact piece 71a provided in the lens mount 71 with the electric contact piece 41a provided in the body mount 41, the body microcomputer 50 and the lens microcomputer 80 are electrically connected together, thereby transmitting/receiving information between the body microcomputer 50 and the lens microcomputer 80.

Various pieces of information (lens information) on the interchangeable lens 7 is stored in the nonvolatile memory 80a. The lens information includes, e.g., model information (lens specific information) specifying the interchangeable lens 7, such as information on a manufacturer's name, a manufacturing date, a model number of the interchangeable lens 7, version information on software installed in the lens microcomputer 80, information on firmware update, etc.; information on whether or not the interchangeable lens 7 includes a unit configured to correct an image blur, such as the blur correction lens drive section 74a, the blur detection section 84, etc.; information on a model number and detection performance (e.g., sensitivity etc.) of the blur detection section 84 when the unit configured to correct the image blur is mounted; information (lens-side correction performance information) on a mode number and correction performance (e.g., the maximum correctable angle etc.) of the blur correction lens drive section 74a; version information on software for performing image blur correction.

The lens information further includes information (lens-side power consumption information) on power consumption necessary for driving the blur correction lens drive section 74a, and information (lens-side drive method information) on a method for driving the blur correction lens drive section 74a. Note that the nonvolatile memory 80a can store information transmitted from the body microcomputer 50, and such information may be stored in a memory section of the lens microcomputer 80 instead of the nonvolatile memory 80a.

The focus lens group control section 81 includes an absolute position detection section 81a configured to detect an absolute position of the focus lens group 72 in an optical axis direction, and a relative position detection section 81b configured to detect a relative position of the focus lens group 72 in the optical axis direction. The absolute position detection section 81a detects the absolute position of the focus lens group 72 in a housing of the interchangeable lens 7. The absolute position detection section 81a is formed by, e.g., a several-bit contact-type encoder substrate and a brush, and is capable of detecting the absolute position. The relative position detection section 81b cannot detect the absolute position of the focus lens group 72 by itself, but can detect a moving direction of the focus lens group 72. For example, a two-phase encoder is used for the relative position detection section 81b. Double two-phase encoders (e.g., rotary pulse encoders, MR devices, hall devices, etc.) configured to alternately output binary signals at equal pitches depending on the position of the focus lens group 72 in the optical axis direction are provided so that phases of the pitches of the binary signals are shifted from each other. The lens microcomputer 80 calculates the relative position of the focus lens group 72 in the optical axis direction based on the output from the relative position detection section 81b. The absolute position detection section 81a and the relative position detection section 81b are one example of a focus lens position detection section.

The zoom lens group control section 86 includes an absolute position detection section 86a configured to detect an absolute position of the zoom lens group 75 in the optical axis direction, and a relative position detection section 86b configured to detect a relative position of the zoom lens group 75 in the optical axis direction. The absolute position detection section 86a detects the absolute position of the zoom lens group 75 in the housing of the interchangeable lens 7. The absolute position detection section 86a is formed by, e.g., a several-bit contact-type encoder substrate and a brush, and is capable of detecting the absolute position. The relative position detection section 86b cannot detect the absolute position of the zoom lens group 75 by itself, but can detect a moving direction of the zoom lens group 75. For example, a two-phase encoder is used for the relative position detection section 86b. Double two-phase encoders (e.g., the rotary pulse encoders, the MR devices, the hall devices, etc.) configured to alternately output binary signals at equal pitches depending on the position of the zoom lens group 75 in the optical axis direction are provided so that phases of the pitches of the binary signals are shifted from each other. The lens microcomputer 80 calculates the relative position of the zoom lens group 75 in the optical axis direction based on the output from the relative position detection section 86b. The absolute position detection section 86a and the relative position detection section 86b are one example of a zoom lens position detection section.

The blur detection section 84 includes an angular velocity sensor configured to detect movement of the interchangeable lens 7 due to the hand-induced camera shake etc. The angular velocity sensor outputs a positive/negative angular velocity signal depending on a direction in which the interchangeable lens 7 moves, with reference to output in a state in which the interchangeable lens 7 stands still. Note that, in the present embodiment, two angular velocity sensors are provided in order to detect two directions, i.e., the yawing direction and the pitching direction.

After the filtering, the amplification, etc., the output angular velocity signal is converted into a digital signal by an A/D conversion section, and is transmitted to the lens microcomputer 80.

The blur correction lens unit control section 85 includes a moving distance detection section (not shown in the figure). The moving distance detection section is a detection section configured to detect an actual moving distance of the blur correction lens 74. The blur correction lens unit control section 85 performs a feedback control of the blur correction lens 74 based on output from the moving distance detection section.

Note that, although an example in which the blur detection sections 56, 84 and the blur correction units 45, 74a are mounted in both of the camera body 4 and the interchangeable lens 7 has been described, the blur detection section and the blur correction unit may be mounted in either one of the camera body 4 and the interchangeable lens 7, or may not be mounted in both of the camera body 4 and the interchangeable lens 7 (in such a case, the sequence relating to the blur correction may be eliminated).

Configuration of Imaging Unit

Figure 2:
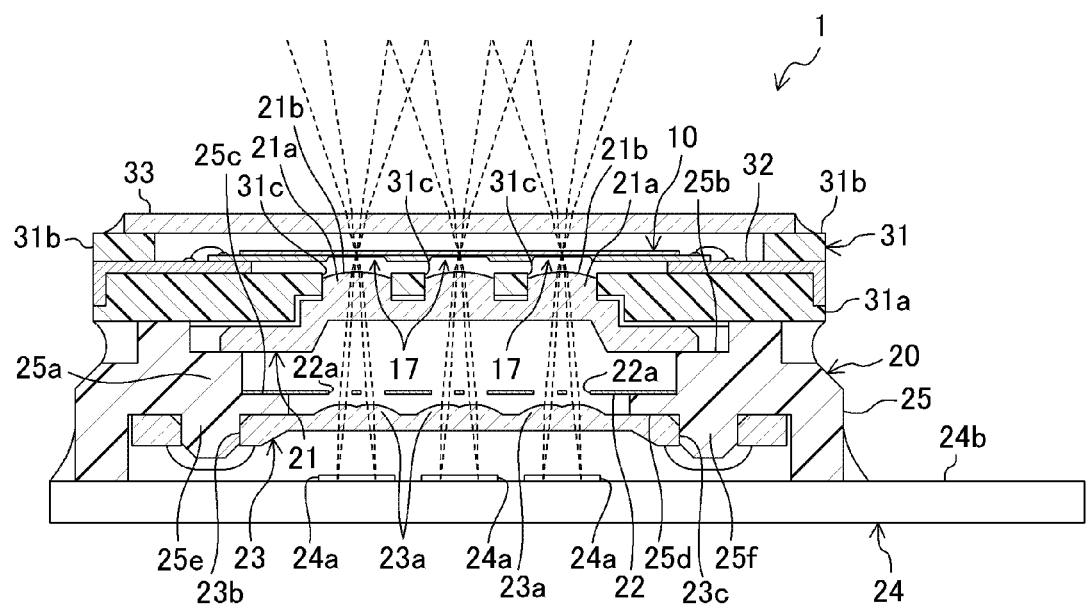
FIG. 2 is a cross-sectional view of an imaging unit.

As illustrated in FIG. 2, the imaging unit 1 includes an imaging device 10 configured to convert a subject image into an electrical signal, a package 31 configured to hold the imaging device 10, and a phase difference detection unit 20 configured to perform focus detection by a phase difference detection method.

Figure 3:
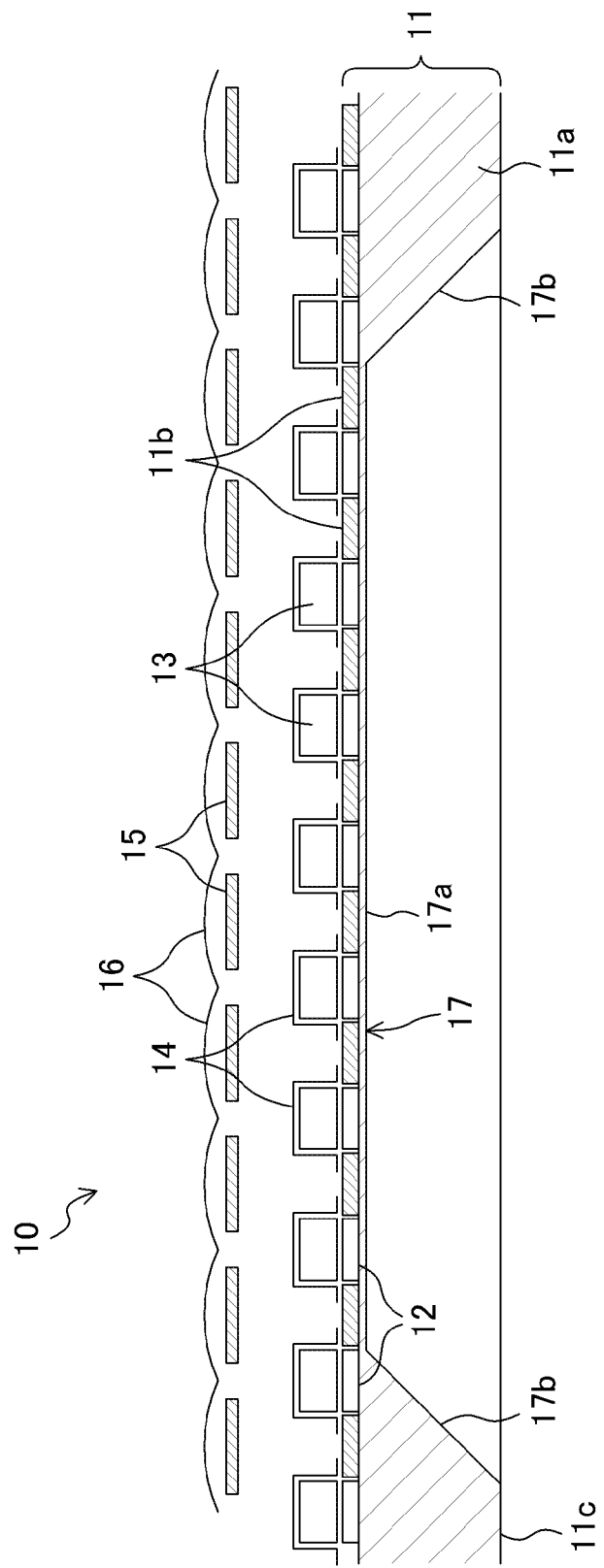
FIG. 3 is a cross-sectional view of an imaging device.

The imaging device 10 is an interline type CCD image sensor. As illustrated in FIG. 3, the imaging device 10 includes a photoelectric conversion section 11 made of semiconductor material, vertical resistors 12, transfer paths 13, masks 14, color filters 15, and microlenses 16.

The photoelectric conversion section 11 includes a substrate 11a, and a plurality of light receiving sections (also referred to as "pixels") 11b arranged on the substrate 11a.

The substrate 11a is formed by a Si (silicon) based substrate. Specifically, the substrate 11a is formed by a Si single crystal substrate or a SOI (silicon on insulator wafer). In particular, the SOI substrate has a sandwich structure of a Si thin film and a SiO2 thin film, and a chemical reaction can be stopped in the SiO2 layer during etching etc. The SOI substrate is advantageous when performing stable substrate processing.

Each of the light receiving sections 11b is formed by a photodiode, and absorbs light to generate an electrical charge. The light receiving sections 11b are provided in micro pixel regions each having a square shape, which are arranged in a matrix on the substrate 11a (see FIG. 4).

The vertical resistor 12 is provided for each of the light receiving sections 11b, and functions to temporarily store an electrical charge stored in the light receiving section 11b. That is, the electrical charge stored in the light receiving section 11b is transferred to the vertical resistor 12. The electrical charge transferred to the vertical resistor 12 is transferred to a horizontal resistor (not shown in the figure) through the transfer path 13, and is sent to an amplifier (not shown in the figure). The electrical charge sent to the amplifier is amplified and removed as an electrical signal.

The mask 14 is provided so that the light receiving section 11b is exposed therethrough toward a subject, and the vertical resistor 12 and the transfer path 13 are covered by the mask 14, thereby reducing or preventing entering of light into the vertical resistor 12 and the transfer path 13.

Figure 4:
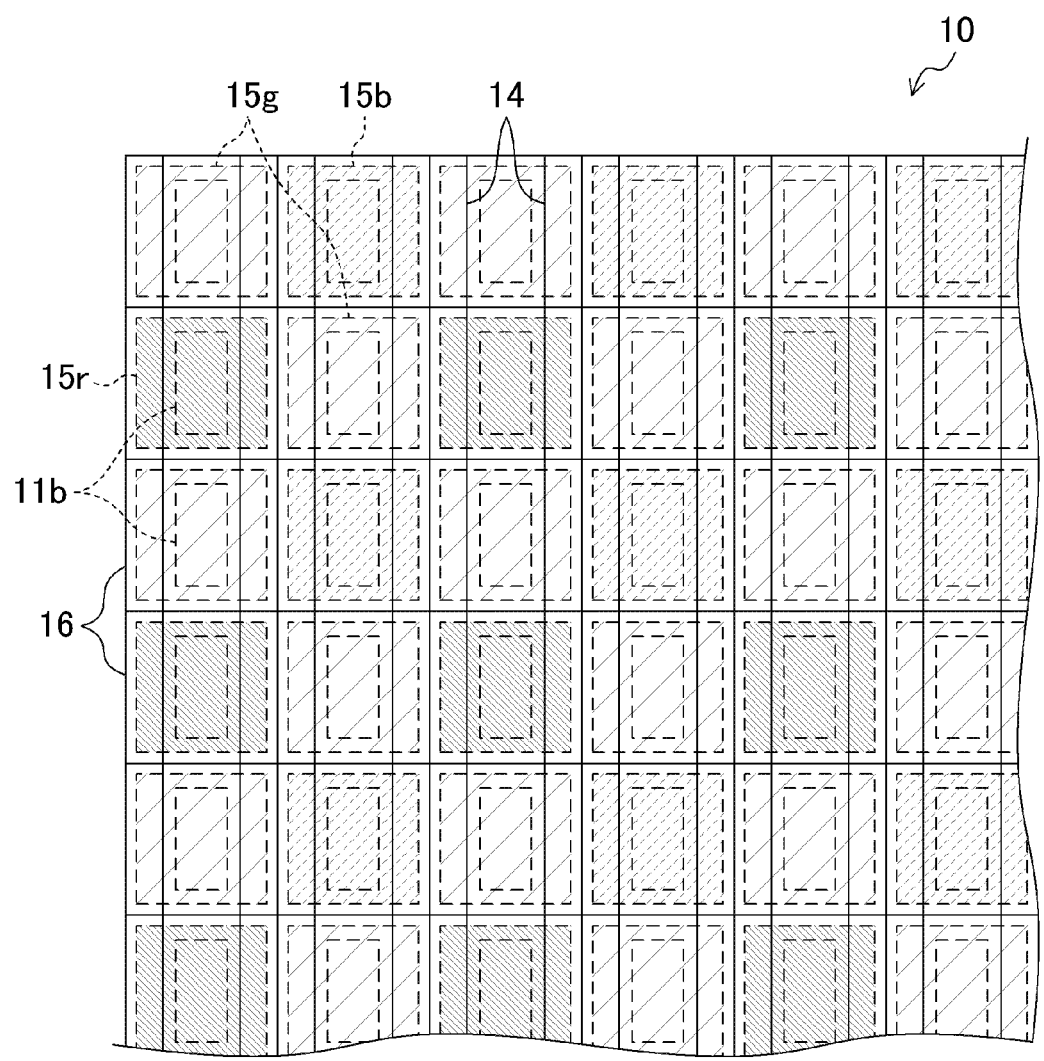
FIG. 4 is a plan view of the imaging device.

The color filter 15 and the microlens 16 are provided corresponding to each of the light receiving sections 11b in the micro pixel region having the square shape. The color filter 15 transmits only a specific color, and a primary color filter or a complementary color filter is used as the color filter 15. As illustrated in FIG. 4, in the present embodiment, a so-called "Bayer primary color filter" is used. That is, suppose that four color filters 15 (or four pixel regions) adjacent to each other in two rows and two columns are grouped as a single repeat unit in the imaging device 10. As for the single repeat unit, two green color filters 15g (i.e., color filters having a higher transmittance in a visible light wavelength range for green than in visible light wavelength ranges for colors other than green) are arranged in one of diagonal directions, and a red color filter 15r (i.e., a color filter having a higher transmittance in a visible light wavelength range for red than in visible light wavelength ranges for colors other than red) and a blue color filter 15b (i.e., a color filter having a higher transmittance in a visible light wavelength range for blue than in visible light wavelength ranges for colors other than blue) are arranged in the other diagonal direction. When the entire imaging device 10 is viewed, the green color filters 15g are alternately arranged in the vertical and horizontal directions.

The microlens 16 collects light and allows the collected light to enter the light receiving section 11b. The light receiving section 11b can be efficiently irradiated with light by the microlens 16.

In the imaging device 10 configured in the foregoing manner, light collected by the microlenses 16 enter the color filters 15r, 15g, 15b. Only light having a color corresponding to each of the color filters transmits through the color filter, and the corresponding light receiving section 11b is irradiated with the light. Each of the light receiving sections 11b absorbs light to generate an electrical charge. The electrical charge generated in the light receiving section 11b is sent to the amplifier through the vertical resistor 12 and the transfer path 13, and is output as an electrical signal. That is, an amount of received light having the color corresponding to each of the color filters can be obtained from each of the light receiving sections 11b as output.

In this manner, the imaging device 10 performs the photoelectric conversion by the light receiving sections 11b provided across an entire imaging surface, thereby converting a subject image formed on the imaging surface into an electrical signal.

A plurality of light transmitting portions 17 through which irradiation light transmits are formed in the substrate 11a. In the present embodiment, three light transmitting portions 17 are formed so as to be arranged along a longitudinal direction in the middle of the substrate 11a in a short-side direction. A surface 11c (hereinafter simply referred to as a "back surface") of the substrate 11a, which is opposite to a surface on which the light receiving sections 11b are provided are cut, polished, or etched to provide concave-shaped recesses, thereby forming the light transmitting portions 17. Each of the light transmitting portions 17 is thinner than a portion of the substrate 11a therearound. More specifically, each of the light transmitting portions 17 includes a recess-bottom surface 17a at which the substrate 11a is the thinnest, and inclined surfaces 17b each connecting between the recess-bottom surface 17a and the back surface 11c. Note that the number of light transmitting portions 17 are not limited to three. For example, nine light transmitting portions 17 may be arranged in a 3 by 3 matrix, or 16 light transmitting portions 17 may be arranged in a 4 by 4 matrix.

By forming the light transmitting portion 17 of the substrate 11a so as to have a thickness which allows light to transmit through the light transmitting portion 17, a part of light with which the photoelectric conversion section 11 and the light transmitting portion 17 are irradiated is not converted into an electrical charge, and transmits through the photoelectric conversion section 11. For example, by setting the thickness of the light transmitting portion 17 of the substrate 11a to about 2-3 μm, about 50% of light having a longer wavelength than that of near-infrared light can transmit through the light transmitting portion 17.

Each of the inclined surfaces 17b is set to an angle at which light reflected from the inclined surface 17b when transmitting through the light transmitting portion 17 does not direct toward condenser lenses 21a of the phase difference detection unit 20 which will be described later. This reduces or prevents formation of a non-real image on a line sensor 24a which will be described later.

The light transmitting portion 17 forms a thin portion through which light entering the imaging device 10 transmits, i.e., passes. At least in this specification, the term "pass" includes a concept of "transmit."

The imaging device 10 configured in the foregoing manner is held by the package 31 (see FIG. 2). The package 31 forms a holding portion.

Specifically, in the package 31, a frame 32 is provided in a flat bottom plate 31a, and upright walls 31b provided on all four sides of the bottom plate 31a. The imaging device 10 is mounted on the frame 32 and is electrically connected to the frame 32 through bonding wires in a state in which the imaging device 10 is surrounded by the upright walls 31b.

A cover glass 33 is attached to ends of the upright walls 31b of the package 31 so as to cover the imaging surface (surface on which the light receiving sections 11b are provided) of the imaging device 10. The cover glass 33 protects the imaging surface of the imaging device 10 from, e.g., dust etc.

Openings 31c are formed so as to penetrate the bottom plate 31a of the package 31 in positions corresponding to the light transmitting portions 17 of the imaging device 10 so that the number of openings 31c is the same as the number of light transmitting portions 17. The openings 31c allow light transmitting through the imaging device 10 to reach the phase difference detection unit 20 which will be described later. The opening 31c forms a light passing portion.

Note that the openings 31c are not necessarily formed so as to penetrate the bottom plate 31a of the package 31. That is, as long as light transmitting through the imaging device 10 reaches the phase difference detection unit 20, e.g., a configuration may be employed, in which transparent portions or semi-transparent portions are formed in the bottom plate 31a.

The phase difference detection unit 20 is provided on the back of the imaging device 10 (on a side opposite to the subject), and receives light passing through the imaging device 10 to perform phase difference detection. Specifically, the phase difference detection unit 20 performs the phase difference detection to detect a defocus amount of the subject. The phase difference detection unit 20 forms a focus detection section.

Figure 5:
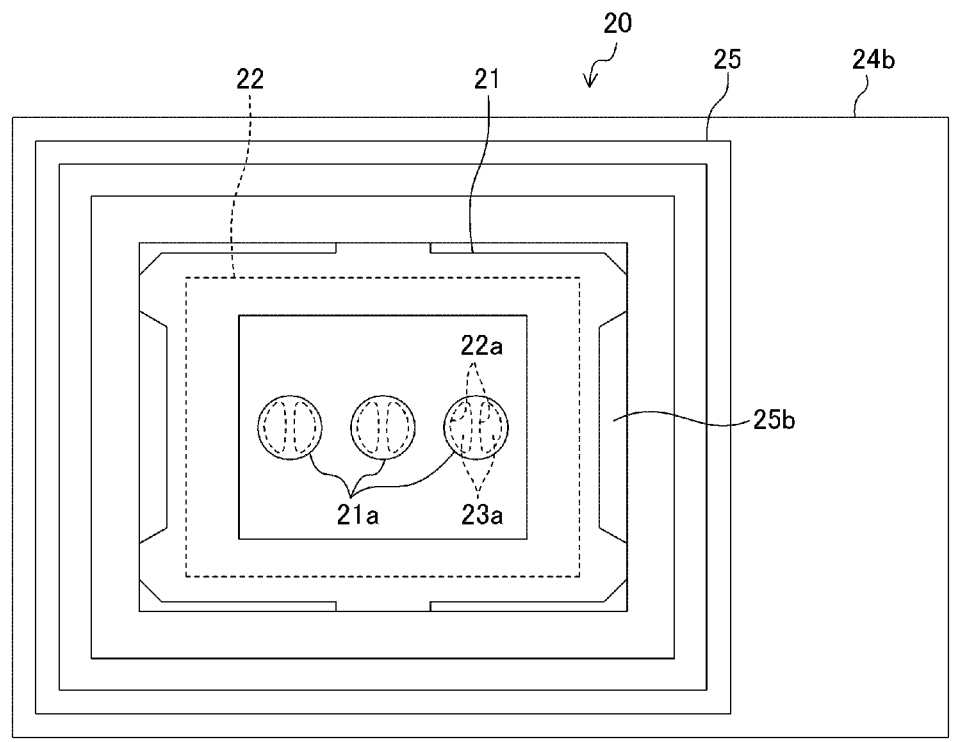
FIG. 5 is a plan view of a phase detection unit.

As illustrated in FIGS. 2 and 5, the phase difference detection unit 20 includes a condenser lens unit 21, a mask member 22, a separator lens unit 23, a line sensor unit 24, and a module frame 25 to which the condenser lens unit 21, the mask member 22, the separator lens unit 23, and the line sensor unit 24 are attached. The condenser lens unit 21, the mask member 22, the separator lens unit 23, and the line sensor unit 24 are arranged in this order from a side on which the imaging device 10 is provided along a thickness direction of the imaging device 10.

The condenser lens unit 21 is a single unit formed by integrating a plurality of condenser lenses 21a. The same number of condenser lenses 21a as the number of light transmitting portions 17 are provided. Each of the condenser lenses 21a collects incident light. The condenser lens 21a collects light which transmits through the imaging device 10 and which is being diffused, and guides the light to a separator lens 23a of the separator lens unit 23, which will be described later. Each of the condenser lenses 21a is formed so that a light incident surface 21b of the condenser lens 21a is in a raised shape, and a portion of the condenser lens 21a close to the light incident surface 21b is in a cylindrical shape.

Since an angle of incident light into each of the separator lenses 23a becomes acute (i.e., the incident angle is reduced) by providing the condenser lenses 21a, aberration of the separator lens 23a can be reduced, and a distance between subject images on the line sensor 24a which will be described later can be reduced. As a result, reduction in size of the separator lens 23a and the line sensor 24a can be realized. When a focus position of a subject image from the optical imaging system is greatly displaced from the imaging unit 1 (specifically, the focus position is greatly displaced from the imaging device 10 of the imaging unit 1), contrast of the subject image is extremely lowered. However, according to the present embodiment, the size reduction of the condenser lens 21a and the separator lens 23a reduces the lowering of the contrast, thereby increasing a focus detection range. Note that, if high-accuracy phase difference detection etc. are performed near the focus position, or the separator lens 23a, the line sensor 24a, etc. have sufficient dimensions, it is not necessary to provide the condenser lens unit 21.

The mask member 22 is provided between the condenser lens unit 21 and the separator lens unit 23. In the mask member 22, two mask openings 22a are formed in positions corresponding to the separator lenses 23a. That is, the mask member 22 divides a lens surface of each of the separator lenses 23a into two regions, and only the two regions are exposed toward a side on which the condenser lenses 21a are provided. In other words, the mask member 22 performs pupil division, i.e., divides light collected by the condenser lens 21a into two light beams, and allows the light beams to enter the separator lens 23a. The mask member 22 can block harmful light etc. from one of adjacent two of the separator lenses 23a so that such light does not enter the other adjacent separator lens 23a. Note that the mask member 22 is not necessarily provided.

The separator lens unit 23 includes a plurality of separator lenses 23a, and is a single unit formed by integrating the plurality of separator lenses 23a. As is the case for the condenser lenses 21a, the same number of separator lenses 23a as the number of light transmitting portions 17 are provided. The two light beams passing through the mask member 22 and entering each of the separator lenses 23a forms an image on the line sensor 24a as two identical subject images.

The line sensor unit 24 includes a plurality of line sensors 24a, and a mounting portion 24b on which the line sensors 24a are mounted. As is the case for the condenser lenses 21a, the same number of line sensors 24a as the number of light transmitting portions 17 are provided. Each of the line sensors 24a receives an image formed on the imaging surface and converts the image into an electrical signal. That is, a distance between the two subject images can be detected based on output from the line sensor 24a, and a focus shift amount (i.e., a defocus amount (Df amount)) of a subject image formed on the imaging device 10 and a direction (i.e., a defocus direction) in which the focus is shifted (the Df amount, the defocus direction, etc. are hereinafter referred to as "defocus information") can be obtained based on the distance.

The condenser lens unit 21, the mask member 22, the separator lens unit 23, and the line sensor unit 24 which are configured in the foregoing manner are provided in the module frame 25.

The module frame 25 is a member formed in a frame-like shape, and an inwardly-protruding attachment portion 25a is provided on an inner circumferential surface of the module frame 25. A first attachment portion 25b and a second attachment portion 25c are formed in a step-like shape in a portion of the attachment portion 25a closer to the imaging device 10. A third attachment portion 25d is formed in a portion of the attachment portion 25a on a side opposite to the imaging device 10.

From the side on which the imaging device 10 is provided, the mask member 22 is attached to the second attachment portion 25c of the module frame 25, and the condenser lens unit 21 is attached to the first attachment portion 25b. As illustrated in FIGS. 2 and 5, the condenser lens unit 21 and the mask member 22 are formed so as to be fitted into the module frame 25 along circumferential portions thereof when the condenser lens unit 21 and the mask member 22 are attached to the first attachment portion 25b and the second attachment portion 25c, respectively. Thus, positions of the condenser lens unit 21 and the mask member 22 are determined relative to the module frame 25.

The separator lens unit 23 is attached to the third attachment portion 25d of the module frame 25 from the side opposite to the imaging device 10. Positioning pins 25e and direction reference pins 25f which protrude toward a side opposite to the condenser lens unit 21 are provided in the third attachment portion 25d. On the other hand, in the separator lens unit 23, positioning holes 23b and direction reference holes 23c are formed in positions corresponding to the positioning pins 25e and the direction reference pins 25f. Diameters of the positioning pin 25e and the positioning hole 23b are set so that the positioning pin 25e is closely fitted into the positioning hole 23b. On the other hand, diameters of the direction reference pin 25f and the direction reference hole 23c are set so that the direction reference pin 25f is loosely fitted into the direction reference hole 23c. That is, an attitude of the separator lens unit 23, such as a direction in which the separator lens unit 23 is attached to the third attachment portion 25d is determined by inserting the positioning pin 25e and the direction reference pin 25f of the third attachment portion 25d into the positioning hole 23b and the direction reference hole 23c, and a position of the separator lens unit 23 is determined relative to the third attachment portion 25d by closely fitting the positioning pin 25e into the positioning hole 23b. When the separator lens unit 23 is attached to the module frame 25 in the determined attitude and position, the lens surface of each of the separator lenses 23a faces the condenser lens unit 21, and also faces each of the mask openings 22a.

In the foregoing manner, the condenser lens unit 21, the mask member 22, and the separator lens unit 23 are attached to the module frame 25 so that the positions of the condenser lens unit 21, the mask member 22, and the separator lens unit 23 are determined relative to the module frame 25. That is, a positional relationship among the condenser lens unit 21, the mask member 22, and the separator lens unit 23 is determined through the module frame 25.

The line sensor unit 24 is attached to the module frame 25 from the back of the separator lens unit 23 (from the side opposite to the condenser lens unit 21). In such a state, after a position of the line sensor unit 24 is determined so that light transmitting through each of the separator lenses 23a enters the line sensor 24a, the line sensor unit 24 is attached to the module frame 25.

Thus, the attachment of the condenser lens unit 21, the mask member 22, the separator lens unit 23, and the line sensor unit 24 to the module frame 25 allows the condenser lenses 21a, the mask member 22, the separator lenses 23a, and the line sensors 24a to be arranged in the determined positions so that the following state can be realized: light entering and transmitting through the condenser lenses 21a enters the separator lenses 23a through the mask member 22, and the light transmitting through the separator lenses 23a forms an image on the line sensors 24a.

The imaging device 10 and the phase difference detection unit 20 which are configured in the foregoing manner are bonded together. Specifically, the openings 31c of the package 31 of the imaging device 10 and the condenser lenses 21a of the phase difference detection unit 20 are engaged with each other. That is, the module frame 25 is bonded to the package 31 in a state in which the condenser lenses 21a of the phase difference detection unit 20 are closely fitted into the openings 31c of the package 31 of the imaging device 10. Thus, the imaging device 10 and the phase difference detection unit 20 can be bonded together so that positions of the imaging device 10 and the phase difference detection unit 20 are determined. As in the foregoing, the condenser lenses 21a, the separator lenses 23a, and the line sensors 24a are integrated into a single unit, and the unit is attached to the package 31.

In the foregoing state, all of the condenser lenses 21a may be closely fitted into all of the openings 31c. Alternatively, some of the condenser lenses 21a may be closely fitted into the corresponding openings 31c, and the remaining condenser lenses 21a may be loosely fitted into the corresponding openings 31c. In the latter case, it is preferred that the condenser lens 21a closest to the center of the imaging surface is closely fitted into the corresponding opening 31c for positioning in the imaging surface, and the condenser lens 21a farthest from the center of the imaging surface is closely fitted into the corresponding to the opening 31c for positioning around the condenser lens 21a and the opening 31c at the center of the imaging surface (i.e., for determining an rotational angle of the condenser lens 21a and the opening 31c at the center of the imaging surface).

As a result of bonding the imaging device 10 and the phase difference detection unit 20 together, the condenser lens 21a, a pair of the mask openings 22a of the mask member 22, the separator lens 23a, and the line sensor 24a are arranged for each of the light transmitting portions 17 on the back of the substrate 11a. That is, as illustrated in FIGS. 2 and 5, since the three light transmitting portions 17 are provided in the imaging device 10, three sets each including the condenser lens 21a, the two mask openings 22a, the separator lens 23a, and the line sensor 24a are provided. In other words, the camera 100 includes three focus detection areas where the phase difference detection can be performed.

Note that the number of sets each including the condenser lens 21a etc. may be changed depending on the number of light transmitting portions 17. As will be described later, if the substrate 11a is thinly formed across an entire surface of the substrate 11a, the entire surface of the substrate 11a serves as a light transmitting portion. Thus, any number of sets each including the condenser lens 21a etc. may be provided regardless of the light transmitting portion.

As in the foregoing, in the imaging device 10 configured to transmit light, the openings 31c are formed in the bottom plate 31a of the package 31 in which the imaging device 10 is placed, and therefore light transmitting through the imaging device 10 can easily reach the back of the package 31. In addition, the phase difference detection unit 20 is arranged on the back of the package 31, and therefore a configuration in which light transmitting through the imaging device 10 is received by the phase difference detection unit 20 can be easily realized.

Any configurations may be employed for the openings 31c formed in the bottom plate 31a of the package 31 as long as light transmitting through the imaging device 10 reaches the back of the package 31. However, the formation of the openings 31c which are though-holes allows light transmitting through the imaging device 10 to reach the back of the package 31 without light attenuation.

By using the openings 31c into which the condenser lenses 21a are closely fitted, the position of the phase difference detection unit 20 relative to the imaging device 10 can be determined. Note that, if the condenser lenses 21a are not provided, a configuration in which the separator lenses 23a are closely fitted into the openings 31c is employed, and therefore the position of the phase difference detection unit 20 relative to the imaging device 10 can be determined as in the foregoing.

In addition, since the condenser lenses 21a penetrating the bottom plate 31a of the package 31 can be arranged closer to the substrate 11a, the imaging unit 1 can be configured as a compact unit.

Note that, in the imaging device 10, the entire substrate 11a may be thinly formed so that light can transmit therethrough, instead of forming the light transmitting portions 17 in the substrate 11a. When the substrate 11a configured in such a manner is used, a case may be considered, where the imaging device 10 is used as a back-surface irradiation type imaging device. In such a case, the inverted imaging device 10 is used, and light enters the substrate 11a through the back surface of the substrate 11a to exit through a front surface. Then, the photoelectric conversion of the light is performed by the light receiving sections 11b positioned on the front surface of the substrate 11a. In the back-surface irradiation type imaging device, incident light also transmits through the substrate 11a. Thus, the phase difference detection unit 20 is arranged on a side from which light exits relative to the substrate 11a, thereby performing the phase difference detection by using light transmitting through the substrate 11a.

Figure 6:
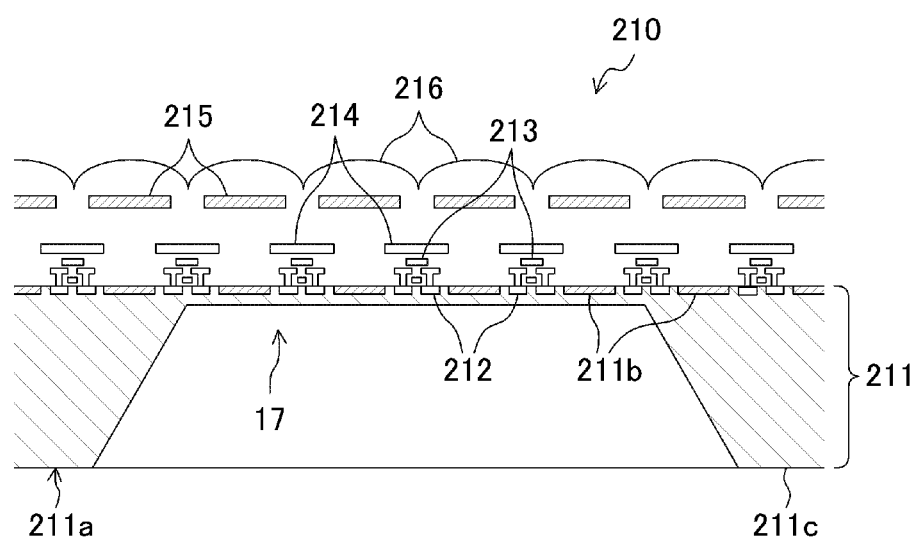
FIG. 6 is a cross-sectional view of an imaging device of a variation.

The imaging device 10 is not limited to the CCD image sensor, but may be the CMOS image sensor as illustrated in FIG. 6.

An imaging device 210 is the CMOS image sensor. The imaging device 210 includes a photoelectric conversion section 211 made of semiconductor material, transistors 212, signal lines 213, masks 214, color filters 215, and microlenses 216.

The photoelectric conversion section 211 includes a substrate 211a and light receiving sections 211b each formed by photodiode. The transistor 212 is provided for each of the light receiving sections 211b. An electrical charge stored in the light receiving section 211b is amplified by the transistor 212, and is output to the outside through the signal line 213. The mask 214, the color filter 215, and the microlens 216 have configurations similar to those of the mask 14, the color filter 15, and the microlens 16.

As in the CCD image sensor, light transmitting portions 17 through which irradiation light transmits are formed in the substrate 211a. A surface 211c (hereinafter simply referred to as a "back surface") of the substrate 211a, which is opposite to a surface on which the light receiving sections 211b are provided are cut, polished, or etched to provide concave-shaped recesses, thereby forming the light transmitting portions 17. Each of the light transmitting portions 17 is thinner than a portion of the substrate 211a therearound.

In the CMOS image sensor, a gain of the transistor 212 can be set for each of the light receiving sections 211b. Thus, the gain of each of the transistors 212 is set based on whether or not each of the light receiving sections 11b is positioned corresponding to the light transmitting portion 17, and a type of a color of the color filter 15 corresponding to the light receiving section 11b, thereby reducing or preventing a case where portions of an image corresponding to the light transmitting portions 17 cannot be properly shot.

Basic Shooting Sequence

Figure 7:
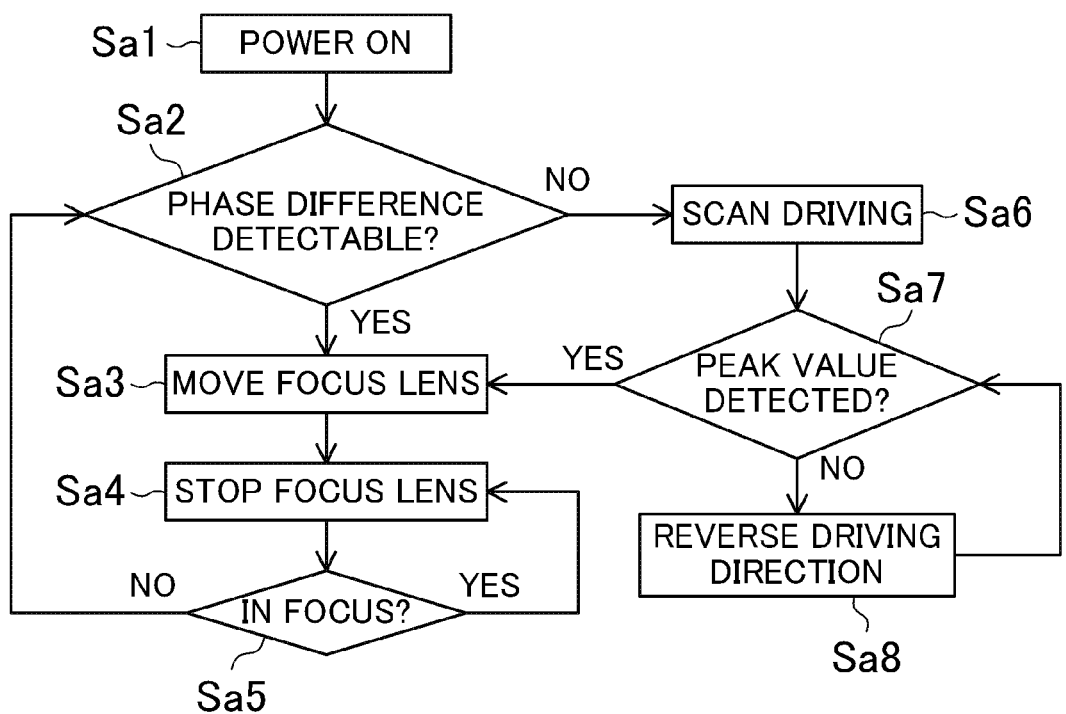
FIG. 7 is a flowchart of an auto-focus sequence at a shooting preparation stage.

FIG. 7 illustrates an auto-focus sequence at a shooting preparation stage after the camera 100 is turned on.

First, when the camera body 4 is turned on (step Sa1), the body control section 5 moves the focus lens group 72 and the zoom lens group 75 to predetermined initial positions. In addition, the body control section 5 performs photometry based on an output signal from the imaging device 10, and obtains a white balance. Then, displaying of a live view image in the image display section 44 is started. Subsequently (or concurrently), the body control section 5 determines whether or not a phase difference is detectable at step Sa2. Specifically, the body control section 5 determines whether or not the phase difference is detectable based on output signals from the line sensors 24a. At this point, in order to perform the phase difference detection as soon as possible, the body control section 5 adjusts sensitivity of the line sensor 24a and an electrical charge storage time to an optimum state based on photometry information within a range in which a sufficient S/N ratio of the line sensor 24a can be ensured.

When the body control section 5 determines that the phase difference is detectable, the body control section 5 drives and moves the focus lens group 72 to a focus position based on the detected phase difference (step Sa3), and then stops the driving of the focus lens group 72 (step Sa4). At step Say, the body control section 5 performs the phase difference detection again and determines whether or not a subject is in focus. Specifically, when the phase difference falls within a predetermined range, the body control section 5 determines that the subject is in focus. If the subject is not in focus, the process returns to step Sa2, and the phase difference detection is performed again. On the other hand, if the subject is in focus, the process returns to step Sa4. As in the foregoing, if the subject is not in focus, the process returns to step Sa2 again, thereby improving accuracy of detecting a focus state.

If a subject image has low contrast, low brightness, or a repeated pattern, the body control section 5 determines at step Sa2 that the phase difference is undetectable. In this case, the process proceeds to step Sa6, and the body control section 5 performs focusing by the so-called "contrast detection method." Specifically, the body control section 5 performs scan driving of the focus lens group 72 at step Sa6. In the scan driving, while detecting contrast of a particular portion of a subject image projected on the imaging device 10 and calculating a predetermined focus evaluation value based on the contrast, the focus lens group 72 is driven in a given direction. At step Sa7, the body control section 5 determines whether or not a peak value of the focus evaluation value is detected. A position of the focus lens group 72, in which the focus evaluation value reaches its peak is the focus position. If the peak value is detected, the body control section 5 moves the focus lens group 72 to the position in which the peak value is detected, at step Sa3.

Subsequently, the process proceeds to step Sa4. That is, even when the body control section 5 determines that the phase difference is undetectable, and the focusing by the so-called contrast detection method is performed, if it is necessary to perform the focusing at the following step, the body control section 5 determines whether or not the phase difference is detectable again and, if detectable, performs focusing by the phase difference detection method. According to the phase difference detection method, a speed of detecting the focus position is fast, and the defocus direction and the defocus amount can be simultaneously determined. Thus, the phase difference detection method has a higher priority whenever possible.

If the peak value is not detected at step Sa7, there is a possibility that the position in which the peak value is detected is on a side opposite to a scan driving direction at step Sa6 relative to a position of the focus lens group 72 when the scan driving is started. Thus, the process proceeds to step Sa8. A driving direction of the focus lens group 72 is reversed, and the scan driving is continued. Subsequently, the process returns to step Sa7. As described above, if the peak value is detected, the process proceeds to step Sa3.

By repeating the foregoing basic shooting sequence, focusing on a subject is continued until a shooting trigger is provided, i.e., until the release button 40b is pressed halfway down for shooting a still image or the REC button 40d is pressed for shooting a motion image. Such an auto-focusing is referred to as a "continuous AF." On the other hand, for shooting a still image, the driving of the focus lens group 72 is stopped once the subject is in focus. Such an auto-focusing control is referred to as a "one-shot AF." The continuous AF and the one-shot AF for shooting an still image can be arbitrarily selected by a photographer. In the continuous AF, steps Sa4, Sa5 are repeated. If the focus is deviated while repeating the steps Sa4, Sa5, the process proceeds to step Sa2, and the foregoing steps are repeated. On the other hand, in the one-shot AF, after step Sa5, the driving of the focus lens group 72 is stopped at step Sa4, and the process is completed. That is, in the one-shot AF, the position of the focus lens group 72 is fixed (i.e., the focus lens group 72 is in an AF lock mode) in a state in which the subject is in focus.

Subsequently, when the release button 40b is pressed all the way down, or the REC button 40d is pressed, the body control section 5 performs a predetermined shooting control. The release button 40b or the REC button 40d can be pressed at any point during the basic shooting sequence.

Focus Shift Control for Shooting Motion Image

Figure 8:
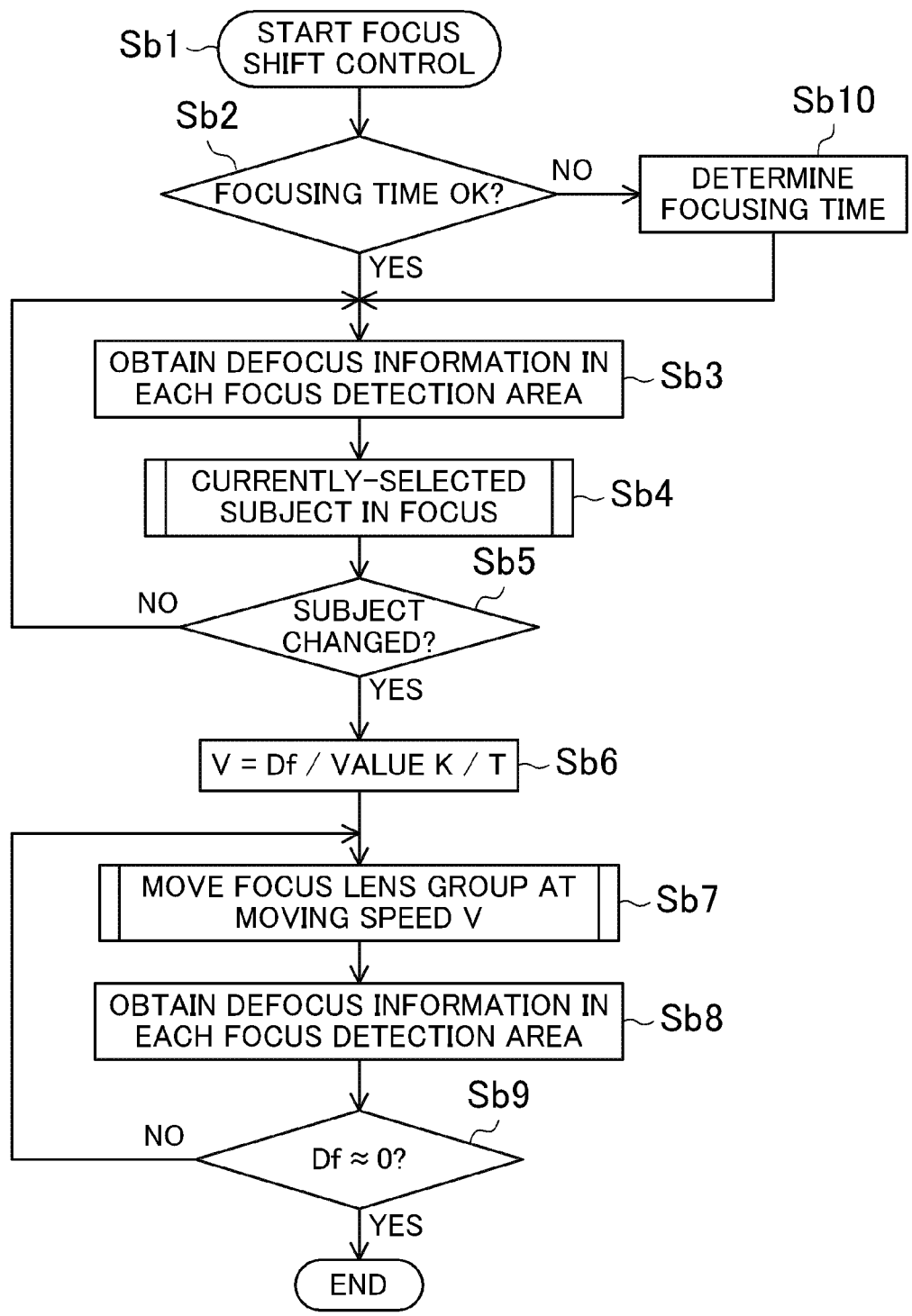
FIG. 8 is a flowchart of a focus shift control.
Figure 9:
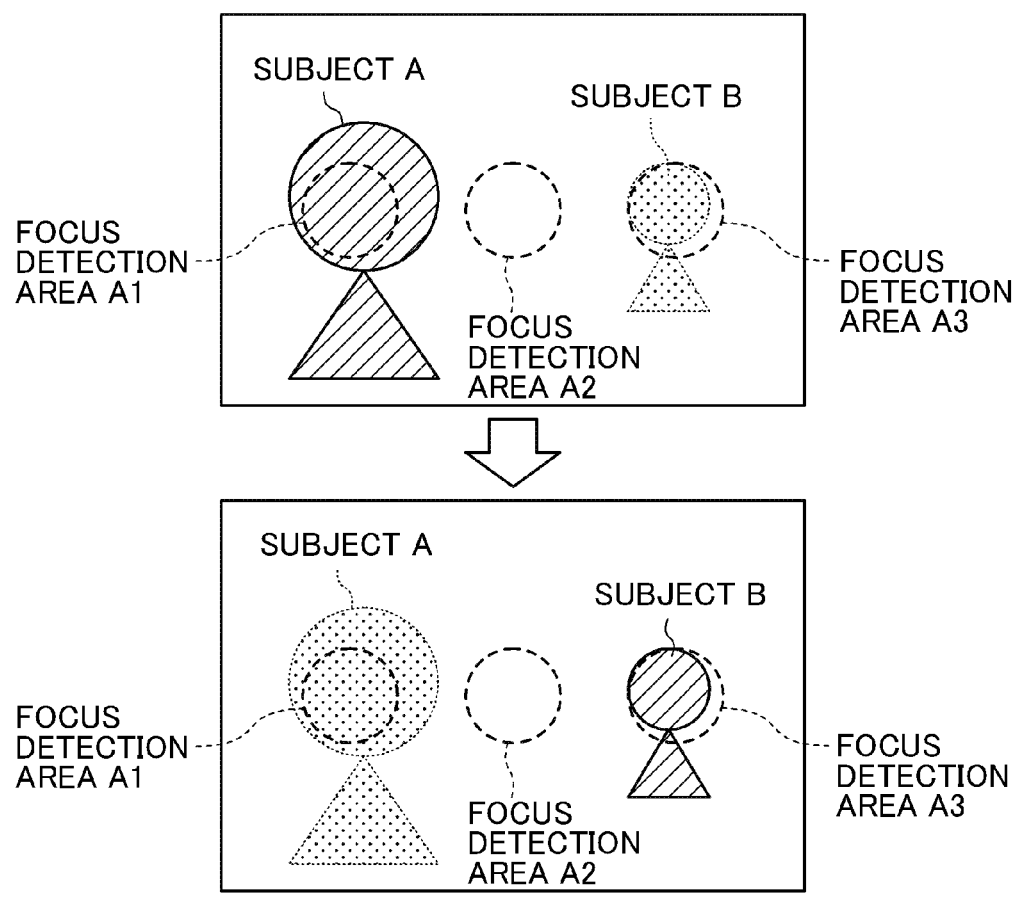
FIG. 9 is a schematic view of an image displayed in an image display section during the focus shift control.

Next, a focus control when a subject in focus is changed while shooting a motion image will be described with reference to FIGS. 8 and 9. Focusing on a different subject from a subject which is currently in focus is referred to as a "focus shift," and a control for the focus shift is referred to as a "focus shift control." FIG. 8 is a flowchart in a case where the focus is shifted from a subject A to a subject B while shooting a motion image illustrated in FIG. 9. FIG. 9 illustrates the image displayed in the image display section 44 when the focus is shifted from the subject A to the subject B.

As described above, in the present embodiment, the imaging surface of the imaging device 10 (i.e., a screen displayed in the image display section 44) includes three focus detection areas A1-A3 where the phase difference detection is performed. In the image display section 44, the three focus detection areas A1-A3 are displayed by circles indicated by dashed lines. Suppose that the subject A is overlapped with the focus detection area A1, the subject B is overlapped with the focus detection area A3, and the subject A is in focus. In such a state, the subject A is in focus based on a phase difference detected by the line sensor 24a corresponding to the focus detection area A1.

The focus shift control when the subject in focus is changed is started by an operation of the focus shift switch 40c (step Sb1). First, when the focus shift switch 40c is turned ON, the body control section 5 confirms a focusing time T with the photographer (step Sb2). The focusing time T is a time required for achieving the focus shift from one subject to a different subject after a condition for starting the focus shift control is satisfied. When an operator selects "OK" (i.e., a current setting for the focusing time is acceptable), the process proceeds to step Sb3. On the other hand, when the operator selects "NG" (i.e., the operator wishes to change the focusing time), the process proceeds to step Sb 10.

At step Sb 10, the body control section 5 displays a focusing time input screen in the image display section 44, and then the operator inputs the focusing time T. After the body control section 5 sets the time input by the operator as the focusing time T, the process proceeds to step Sb3. The operator can determines any focusing time T. At step Sb3, the body control section 5 obtains the defocus information (the defocus amount and the defocus direction) relating to a subject in each of the focus detection areas A1-A3. Specifically, the body control section 5 obtains the defocus information based on output from the line sensors 24a corresponding to the focus detection areas A1-A3. Note that, as will be described later, since only the defocus information in the currently-selected focus detection area and the defocus information in the focus detection area where a subject to be subsequently in focus is present are used for the focus shift control, only the defocus information in such focus detection areas may be obtained.

Subsequently, at step Sb4, the body control section 5 brings the currently-selected subject into focus. In the present embodiment, the subject A is selected as the subject in focus, and therefore the subject A is in focus. Note that a configuration may be employed, in which not a subject but a focus detection area is selected, and a subject overlapped with the focus detection area is in focus. In the foregoing manner, preparation for the focus shift is completed.

At step Sb5, the body control section 5 determines whether or not a trigger is provided to carry out the focus shift. Specifically, satisfaction of a condition for shifting focus is the trigger. The condition for shifting focus in the present embodiment is selection of a different subject other than the subject which is currently in focus. The subject can be selected by operating the touch screen of the image display section 44. That is, an icon for the different subject is simply touched on the touch screen of the image display section 44, thereby selecting the subject. As another operation, the operators moves his finger from an icon for the subject which is currently in focus to an icon for the different subject on the touch screen of the image display section 44, and stops his finger at the icon for the different subject. In such a manner, the different subject can be selected. When any one of the selection operations is detected based on an output signal from the touch screen during the focus shift control, the body control section 5 determines that the trigger is provided (i.e., the condition for shifting focus is satisfied). Then, the process proceeds to step Sb6. On the other hand, when the body control section 5 determines that the trigger is not provided, the process returns to step Sb3, and steps Sb3-Sb5 are repeated. A case where the subject B is selected will be described.

At step Sb6, the body control section 5 calculates a moving amount and a moving speed of the focus lens group 72. Specifically, based on the defocus information in the focus detection areas A1-A3, which is obtained at step Sb3, the body control section 5 calculates a moving speed V of the focus lens group 72 by using the following expression.

$V$=(the defocus amount in the focus detection area ($A$3) overlapped with the subject $B$ to be subsequently in focus)/Value $K/T$ The "value K" is a value which represents a ratio of a moving amount of the focus position to the moving amount of the focus lens group 72, and which is optically determined based on a position of the focus lens group 72 in an optical axis direction (a position of the lens group in the optical axis direction is hereinafter simply referred to as a "position") and a position of the zoom lens group 75. Specifically, the position of the focus lens group 72 can be detected by the absolute position detection section 81a and the relative position detection section 81b of the focus lens group control section 81, and the position of the zoom lens group 75 can be detected by the absolute position detection section 86a and the relative position detection section 86b of the zoom lens group control section 86. A map specifying a relationship of the value K with the positions of the focus lens group 72 and the zoom lens group 75 is stored in the nonvolatile memory 50a. The body control section 5 obtains the current value K for the focus lens group 72 and the zoom lens group 75 based on detection signals from the absolute position detection section 81a and the relative position detection section 81b, detection signals from the absolute position detection section 86a and the relative position detection section 86b, and the map in the nonvolatile memory 50a. By dividing the defocus amount in the focus detection area (A3) to which the focus is shifted by the value K, the moving amount of the focus lens group 72 (specifically, the moving amount of the focus lens group 72, which is required for reducing the defocus amount to zero) corresponding to the defocus amount can be obtained.

By further dividing the moving amount of the focus lens group 72 by the focusing time T, the moving speed V of the focus lens group 72 can be obtained. The focusing time T is different depending on the method of the subject selection which is the trigger for the focus shift at step Sb5. When the different subject is selected by simply touching the touch screen, the focusing time T confirmed at step Sb2 or the focusing time T determined at step Sb10 is used. On the other hand, when the different subject is selected by moving the operator's finger on the touch screen, a time required for moving the finger from the icon for the subject which is currently in focus to the icon for the different subject is used as the focusing time T.

Thus, the moving speed V of the focus lens group 72 can be calculated based on the defocus amount in the focus detection area (A3) to which the focus is shifted, the value K obtained in the foregoing manner, and the determined focusing time T. Note that a map specifying a relationship of the moving speed V of the focus lens group 72 with the position of the focus lens group 72, the position of the zoom lens group 75, the defocus amount, and the focusing time T may be stored in the nonvolatile memory 50a. In such a case, when the position of the focus lens group 72, the position of the zoom lens group 75, the defocus amount, and the focusing time T are given, the moving speed of the focus lens group 72 is determined. Alternatively, a map specifying a relationship of the moving amount of the focus lens group 72 with the position of the focus lens group 72, the position of the zoom lens group 75, and the defocus amount may be stored in the nonvolatile memory 50a. After the moving amount of the focus lens group 72 is obtained based on the table, the moving amount is divided by the focusing time T to obtain the moving speed V of the focus lens group 72. An expression for obtaining the moving speed V of the focus lens group 72, in which the position of the focus lens group 72, the position of the zoom lens group 75, the defocus amount, and the focusing time T are variables may be stored in the nonvolatile memory 50a. In such a case, when the position of the focus lens group 72, the position of the zoom lens group 75, the defocus amount, and the focusing time T are given, the moving speed V of the focus lens group 72 can be also calculated. That is, any configurations may be employed as long as the defocus amount in the focus detection area (A3) to which the focus is shifted, and the focusing time T are used to obtain the moving speed V of the focus lens group 72.

At step Sb7, the body control section 5 moves the focus lens group 72 at the moving speed V obtained at step Sb6 for the focusing time T. As will be appreciated from the description of step Sb6, by moving the focus lens group 72 at the moving speed V for the focusing time T, the focus lens group 72 moves to a position in which it has been expected before the focus shift is started that the subject B is in focus. It is less likely to change a distance to the subject during the focus shift control unless the subject B approaches the camera 100 or moves away from the camera 100. Thus, even in a case where the defocus amount before the focus shift is used, the subject B can be in focus after the focus shift.

Subsequently, as in step Sb3, the body control section 5 obtains the defocus information (the defocus amount and the defocus direction) relating to the subject in each of the focus detection areas A1-A3 (step Sb8). Then, the body control section 5 determines whether or not the defocus amount of the subject B in the focus detection area A3 falls below a predetermined threshold value (step Sb9). The threshold value is a value which is substantially close to zero, and based on which it is determined that a subject is in focus. When the defocus amount falls below the predetermined threshold value, the focus shift control is completed. On the other hand, when the defocus amount is equal to or greater than the predetermined threshold value, the process returns to step Sb7.

That is, steps Sb8, Sb9 are steps for checking whether or not the subject B is in focus after the focus shift. Thus, at step Sb8, only the defocus information in the focus detection area A3 overlapped with the subject B may be obtained.

Note that, after the process returns to step Sb7, the body control section 5 obtains the current value K corresponding to the positions of the focus lens group 72 and the zoom lens group 75, and calculates the moving amount of the focus lens group 72 based on the value K and the defocus amount obtained at step Sb8. Then, the body control section 5 moves the focus lens group 72 by the calculated moving amount. The moving speed of the focus lens group 72 at this point is not set to the moving speed V obtained at step Sb6, but to a moving speed used for typical focusing (e.g., a moving speed corresponding to a defocus amount, which is low in a region where the defocus amount is small, and which is high in a region where the defocus amount is large). Subsequently, steps Sb8, Sb9 are repeated, and it is determined whether or not the subject B is in focus. In such a manner, steps Sb7-Sb9 are repeated until the subject B is in focus.

According to the focus shift control, the moving speed V of the focus lens group 72 is adjusted so that the subject is brought into focus within the focusing time T determined by the photographer. That is, the adjustment of the moving speed V of the focus lens group 72 allows the adjustment of the focusing time T. As a result, the moving speed V of the focus lens group 72, i.e., the focusing time T can be adjusted depending on a photographer's purpose for shooting. For example, for shooting scenes which requires a high-speed performance of the imaging apparatus, such as sports, the focusing time T is set to a shorter period of time, thereby speeding up the focusing. For shooting an artistic motion image such as dramas and movies, the focusing time T is set to a longer period of time, thereby speeding down the focusing.

That is, the focusing by the AF using the contrast detection method has been conventionally performed for shooting a motion image. Thus, when the focus is shifted from the subject A in focus to the subject B, a searching operation (i.e., scan driving for detecting the peak of the focus evaluation value) is required, and overrun is caused near the focus position (i.e., the focus lens group 72 overpasses the focus position). The focusing by the AF using the phase difference detection method is employed in order to avoid the searching operation and the overrun. However, although the AF using the phase difference detection method can instantly detect the focus position, the extremely fast focusing by the AF using the phase difference detection method may cause a case where a motion image satisfying the photographer's purpose for shooting cannot be shot.

On the other hand, according to the present embodiment, before a subject in focus is changed, the moving amount (or a value relating thereto) of the focus lens group 72 required for bringing the subject to be subsequently in focus into focus is detected. When the focus is shifted to the subject to be subsequently in focus, the focus lens group 72 is moved at the moving speed at which the focusing time (time elapsed from a start to an end of the focusing) is adjusted to the determined focusing time T. That is, when a distance between the subject which is currently in focus and the subject to be subsequently in focus is long, the focusing can be performed at the relatively-high moving speed of the focus lens group 72. When the distance between the subject which is currently in focus and the subject to be subsequently in focus is short, the focusing can be performed at the relatively-low moving speed of the focus lens group 72. As in the foregoing, e.g., the focusing time is set to a constant period of time regardless of the defocus amount of the subject to be subsequently in focus, thereby increasing options for a technique for shooting a motion image. As a result, a motion image satisfying the photographer's purpose for shooting can be shot.

Note that, in the foregoing description, the photographer directly selects the subject B when selecting the subject to be subsequently in focus, but the present disclosure is not limited to such a configuration. For example, in order to select the subject to be subsequently in focus, the photographer may select the focus detection area overlapped with such a subject. In such a case, a line indicating the focus detection area may be displayed in the image display section 44 together with the subject. The selection of the focus detection area is tantamount to selecting the subject overlapped with the focus detection area, and can be regarded as indirect selection of the subject by the photographer. In particular, when the number of focus detection areas is small, the selection of the focus detection area is advantageous because the subject for which the phase difference is detectable is substantially selected. However, when the number of focus detection areas is large so that the subject is highly likely to be overlapped with any one of the focus detection areas in any positions of the imaging surface, the photographer may not directly select the focus detection area, but may directly select the subject to be subsequently in focus as described above. Then, the body control section 5 may select the optimum focus detection area for the selected subject, and may perform the focus shift control based on the defocus information in the selected focus detection area.

First Panning Control for Shooting Motion Image

Next, a panning control performing a focus shift associated with panning while shooting a motion image will be described with reference to FIGS. 10 and 11. A control for bringing a different subject other than a subject in focus before the panning into focus is referred to as a "panning control."

Figure 10:
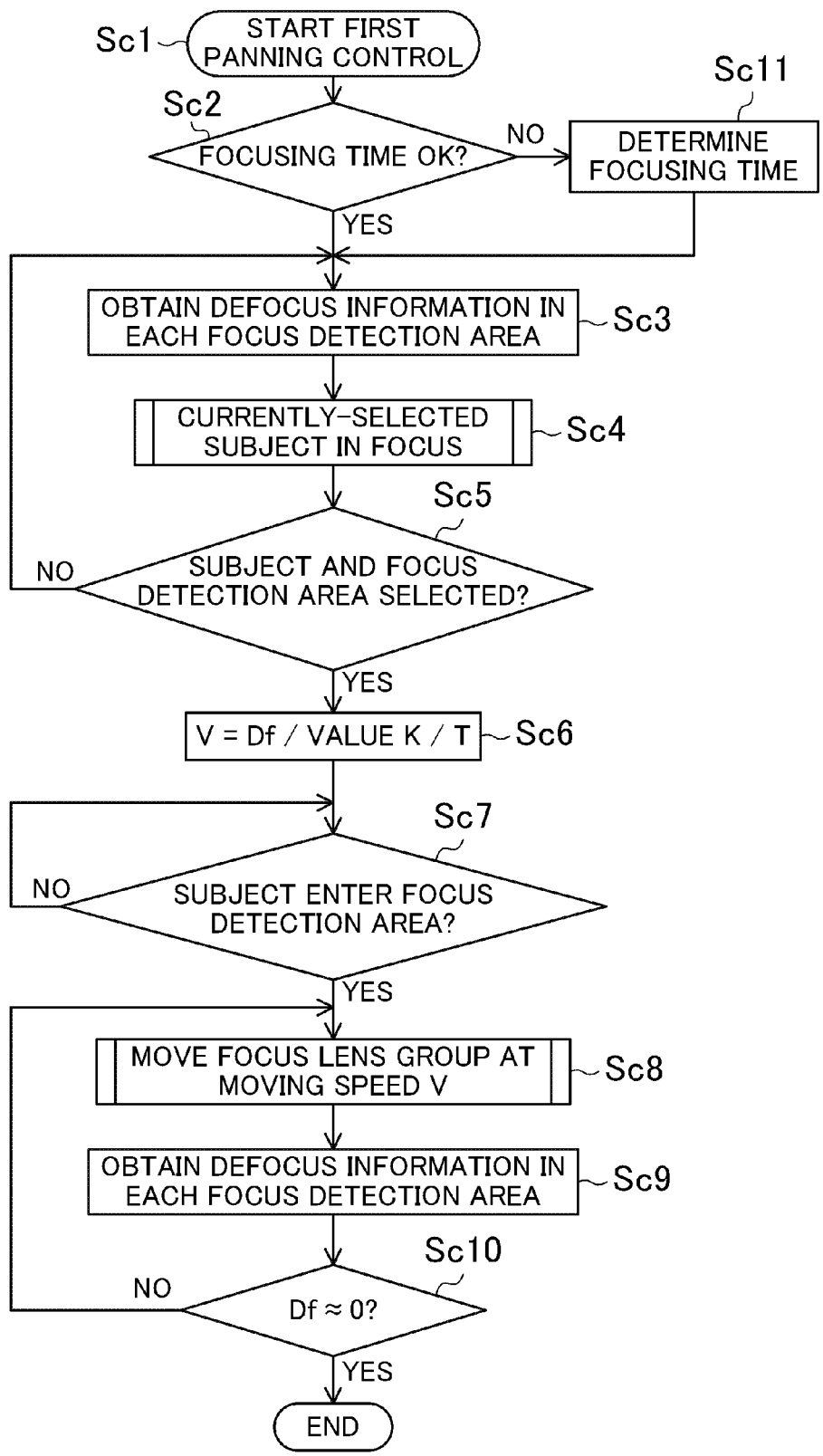
FIG. 10 is a flowchart of a first panning control.
Figure 11:
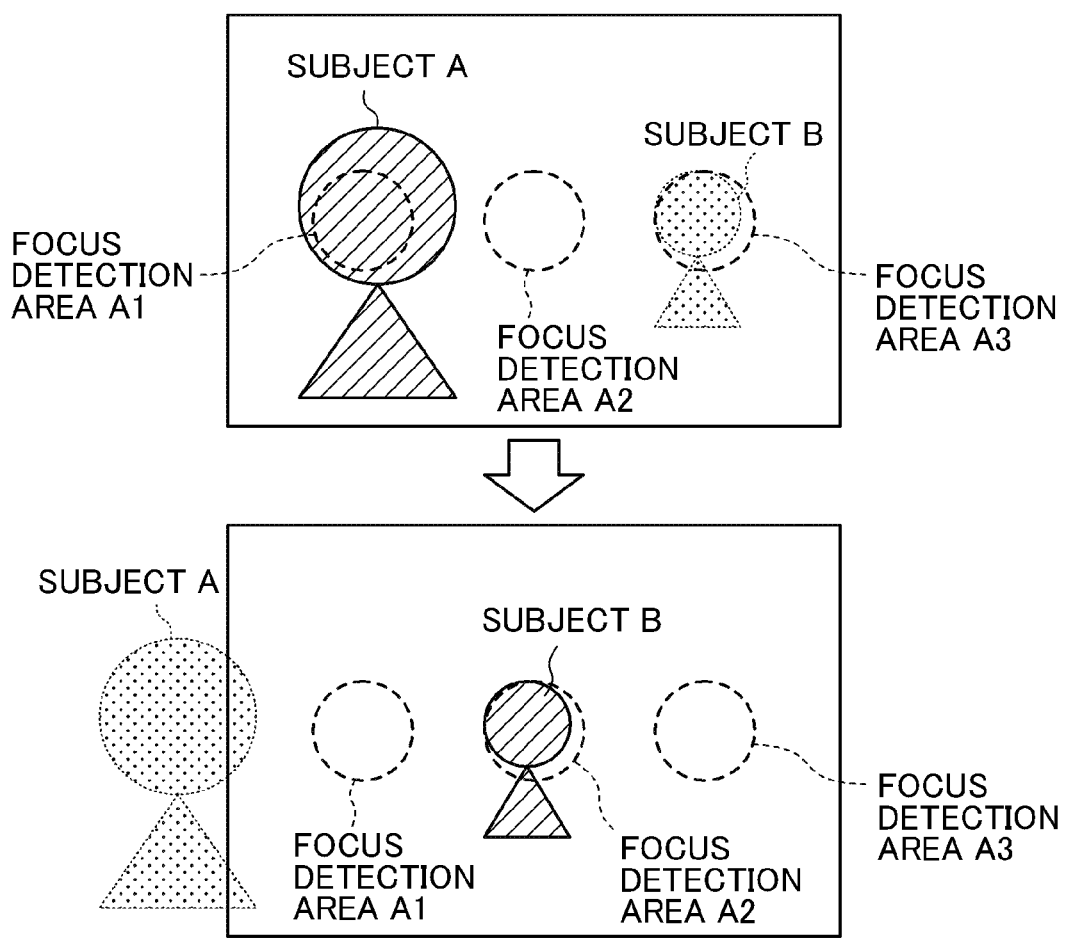
FIG. 11 is a schematic view of an image displayed in the image display section during the first panning control.

FIG. 10 is a flowchart in a case where the focus is shifted from a subject A to a subject B in association with the panning while shooting a motion image of FIG. 11. FIG. 11 illustrates the image displayed in the image display section 44 when the focus is shifted from the subject A to the subject B in association with the panning.

As described above, in the present embodiment, the imaging surface includes the three focus detection areas. Before the focus shift, the subject A is overlapped with the focus detection area A1, and the subject B is overlapped with the focus detection area A3. The subject A is in focus. Starting from such a state, the camera 100 is panned so that the subject B moves to the center of the imaging surface, and then brings the subject B into focus by the focus shift control.

A sequence of a first panning control will be described in detail with reference to FIG. 10.

The panning control is started by the operation of the focus shift switch 40c (step Sc1). When the focus shift switch 40c is operated, the body control section 5 confirms the focusing time T with the photographer (step Sc2). The step for confirming the focusing time T, a step for obtaining the defocus information in each of the focus detection areas A1-A3 (step Sc3), a step for the focusing in the currently-selected focus detection area (step Sc4), and a step for determining the focusing time T (step Sc11) are similar to steps Sb2-Sb4, Sb10 when the subject in focus is changed. Note that the first panning control, the focus shift control, a later-described second panning control, and a later-described third panning control can be selected depending on the operation of the focus shift switch 40c. Note that the focus shift control and the first, second, and third panning controls may be selectable by a method other than the operation of the focus shift switch 40c. Alternatively, the camera 100 may be configured so that only any of the focus shift control and the first, second, and third panning controls can be performed.

That is, when the process proceeds to step Sc4, the confirmation of the focusing time T is completed, and therefore the subject A overlapped with the focus detection area A1 is in focus. Subsequently, at step Sc5, the body control section 5 determines whether or not the photographer selects the subject to be subsequently in focus, and the focus detection area expected as a destination of the subject. That is, in the focus shift control associated with the panning, the photographer selects the subject displayed in the imaging surface other than the subject which is currently in focus as the subject to be subsequently in focus, and selects the focus detection area expected as the destination to which the selected subject relatively moves in the imaging surface in association with the panning and reaches. The foregoing selection is performed by, e.g., operating the touch screen by the photographer. When the subject to be subsequently in focus and the focus detection area expected as the destination are selected, the process proceeds to step Sc6. On the other hand, when no selection is made, the process returns to step Sc3, and steps Sc3-Sc5 are repeated. Note that the focus detection area (focus detection area A1 in FIG. 11) overlapped with the subject which is currently in focus may be selected as the focus detection area expected as the destination.

At step Sc6, the moving speed V of the focus lens group 72 is calculated in the similar manner as step Sb6 of the focus shift control.

Subsequently, at step Sc7, the body control section 5 determines whether or not the subject B relatively moves to the focus detection area selected as the destination by panning the camera 100. In the present embodiment, the selected focus detection area is the focus detection area A2. The body control section 5 detects the relative displacement of the subject B based on image information obtained by the imaging device 10, and determines whether or not the subject B is in the selected focus detection area. When the subject B enters the selected focus detection area A2, the process proceeds to step Sc8. On the other hand, when the subject B does not enter the selected focus detection area A2, step Sc7 is repeated. That is, in the first panning control, the entering of the subject to be subsequently in focus into the focus detection area selected as the destination is the trigger for performing the focus shift, i.e., the condition for shifting focus. Note that the determination whether or not the subject enters the selected focus detection area may be performed based on an input signal transmitted by operating an operational switch etc. by the photographer.

At step Sc8, when the subject B enters the selected focus detection area A2, the body control section 5 moves the focus lens group 72 in the defocus direction obtained at step Sc3 at the moving speed V calculated at step Sc6 for the determined focusing time T. As a result, the focus lens group 72 is moved by the moving amount which is required for reducing the defocus amount to zero and which is estimated based on the defocus amount of the subject B before the focus shift, which is obtained at step Sc3. It is less likely to change the distance to the subject by the panning unless the subject B approaches the camera 100 or moves away from the camera 100. Thus, even by using the defocus amount before the focus shift, the subject B can be in focus after the panning.

Subsequently, at step Sc9, the body control section 5 obtains the defocus information (the defocus amount and the defocus direction) relating to the subject in each of the focus detection areas A1-A3. At step Sc10, the body control section 5 determines whether or not the defocus amount of the subject B, which is obtained at step Sc9 falls below a predetermined threshold value. Such steps are similar to steps Sb8, Sb9 of the focus shift control. That is, the body control section 5 checks whether or not the subject B is in focus after the focus shift.

The threshold value is set to a value based on which it can be determined that the defocus amount is substantially zero, i.e., the subject B is substantially in focus. When the defocus amount is equal to or greater than the predetermined threshold value, the process returns to step Sc8. After the process returns to step Sc8, the body control section 5 obtains a current value K corresponding to the positions of the focus lens group 72 and the zoom lens group 75, and calculates the moving amount of the focus lens group 72 based on the value K and the defocus amount obtained at step Sc9. Then, the body control section 5 moves the focus lens group 72 by the calculated moving amount. The moving speed of the focus lens group 72 is not set to the moving speed V obtained at step Sc6, but to a moving speed used for typical focusing (e.g., the maximum moving speed of the focus lens group 72). Subsequently, steps Sc9, Sc10 are repeated, and the body control section 5 determines whether or not the subject B is in focus.

When it is determined that the defocus amount of the subject B falls below the predetermined threshold value, it is determined that the subject B is in focus at step Sc10. Then, the first panning control is completed.

As in the foregoing, according to the first panning control, the defocus amount (or a value relating thereto) for the subject to be subsequently in focus is detected before the panning. After the panning is performed, and then the subject to be subsequently in focus reaches the predetermined position in the imaging surface, when the camera 100 brings such a subject into focus, the focus lens group 72 is moved at the moving speed at which the focusing time is adjusted to determined focusing time T. Thus, when the defocus amount before the focus shift is large, i.e., the distance between the subject in focus and the subject to be subsequently in focus is long, the focusing can be performed at the relatively-high moving speed of the focus lens group 72. On the other hand, when the defocus amount before the focus shift is small, i.e., the distance between the subject in focus and the subject to be subsequently in focus is short, the focusing can be performed at the relatively-low moving speed of the focus lens group 72. As in the foregoing, e.g., the focusing time is set to a constant period of time regardless of the defocus amount of the subject to be subsequently in focus even during the panning, thereby increasing the options for the technique for shooting a motion image. As a result, a feeling of restlessness of the focusing etc. provided to a viewer of a motion image can be reduced or removed, and a motion image satisfying the photographer's purpose for shooting can be shot.

Second Panning Control

Figure 12:
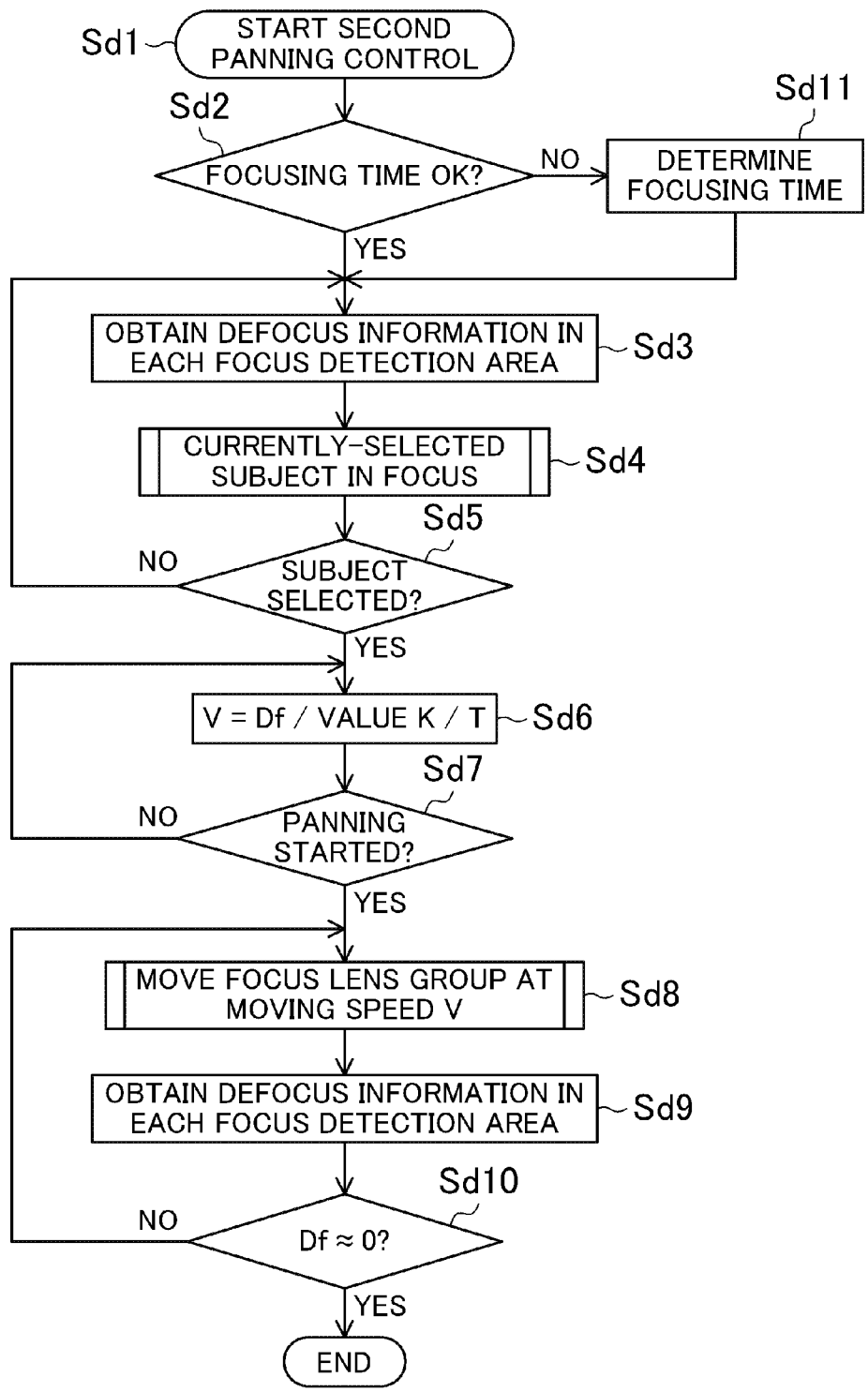
FIG. 12 is a flowchart of a second panning control.

Subsequently, the second panning control will be described. The second panning control is different from the first panning control in a timing of starting the focus shift. FIG. 12 is a flowchart in a case where the focus is shifted from a subject A to a subject B in association with the panning while shooting a motion image of FIG. 11.

Before the focus shift, the subject A is overlapped with the focus detection area A1, and the subject B is overlapped with the focus detection area A3. In addition, the subject A is in focus. Starting from such a state, the camera 100 is panned so that the subject B moves to the center of the imaging surface, and then brings the subject B into focus by the focus shift control.

Flows from a step for operating the focus shift switch 40c (step Sd1) to a step for the focusing in the currently-selected focus detection area (step Sd4), and to a step for determining the focusing time (step Sd11) are similar to the flows according to steps Sc2-Sc4 and Sc11 of the first panning control.

When the process proceeds to step Sd4, the subject A overlapped with the focus detection area A1 is in focus. Subsequently, at step Sd5, the body control section 5 determines whether or not the photographer selects the subject to be subsequently in focus. That is, in the second panning control during the panning, the photographer selects only the subject to be subsequently in focus, and does not select the focus detection area expected as the destination. The foregoing selection is performed by, e.g., operating the touch screen by the photographer. When the subject to be subsequently in focus is selected, the process proceeds to step Sd6. On the other hand, when no selection is made, the process returns to step Sd3, and steps Sd3-Sd5 are repeated.

At step Sd6, the moving speed V of the focus lens group 72 is calculated in the similar manner to step Sc6 of the first panning control.

Subsequently, at step Sd7, the body control section 5 determines whether or not the panning of the camera 100 is started. The body control section 5 detects the relative displacement of the subject B based on the image information obtained by the imaging device 10, and determines based on the moving state of the subject B whether or not the panning is started. For example, the body control section 5 determines that the panning is started when the subject B moves at a speed higher than a predetermined speed for a time period longer than a predetermined time period. That is, in the second panning control, the starting of the panning is the trigger for performing the focus shift, i.e., the condition for shifting focus. Note that the determination on the starting of the panning is not limited to the determination based on the image information. For example, the body control section 5 may require the photographer to operate a switch when the panning is started, and may determines the starting of the panning based on an input signal from an operational switch operated by the photographer.

When the panning is started, the process proceeds to step Sd8. On the other hand, when the panning is not started, the process returns to step Sd6, and steps Sd6, Sd7 are repeated. When the process returns from step Sd7 to step Sd6, it is preferred that the defocus amount of the subject B to be subsequently in focus, which is overlapped with the focus detection area A3 is detected again. As a result, the moving speed V of the focus lens group 72 can be calculated based on an updated defocus amount right before the panning is started.

At step Sd8, when the panning is started, the body control section 5 moves the focus lens group 72 in the defocus direction obtained at step Sd3 at the moving speed V calculated at step Sd6 for the determined focusing time T. As a result, the focus lens group 72 is moved by the moving amount which is required for reducing the defocus amount to zero and which is estimated based on the defocus amount of the subject B before the focus shift, which is obtained at step Sc3. It is less likely to change the distance to the subject by the panning unless the subject B approaches the camera 100 or moves away from the camera 100. Thus, even by using the defocus amount before the focus shift, the subject B can be in focus after the panning.

Subsequently, the process proceeds to steps Sd9, Sd10. Steps Sd9, Sd10 are similar to steps Sc9, Sc10 of the first panning control.

As in the foregoing, in the second panning control during the panning, as soon as the panning is started, the focus shift is also started. That is, the focus is gradually shifted to the subject to be subsequently in focus as the camera 100 is panned, and such a subject is in focus after a lapse of the predetermined focusing time T since the panning is started.

Third Panning Control

Figure 13:
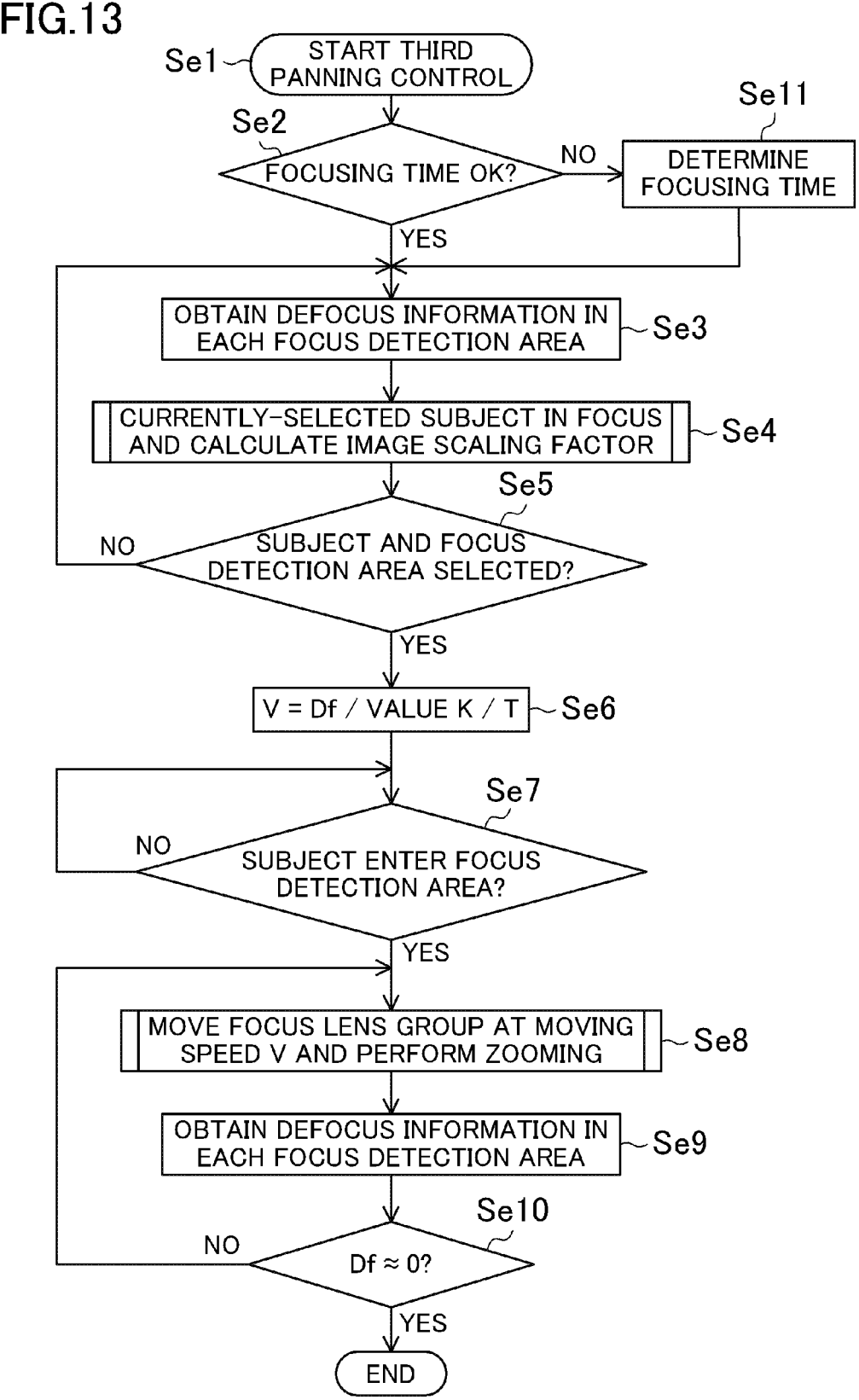
FIG. 13 is a flowchart of a third panning control.
Figure 14:
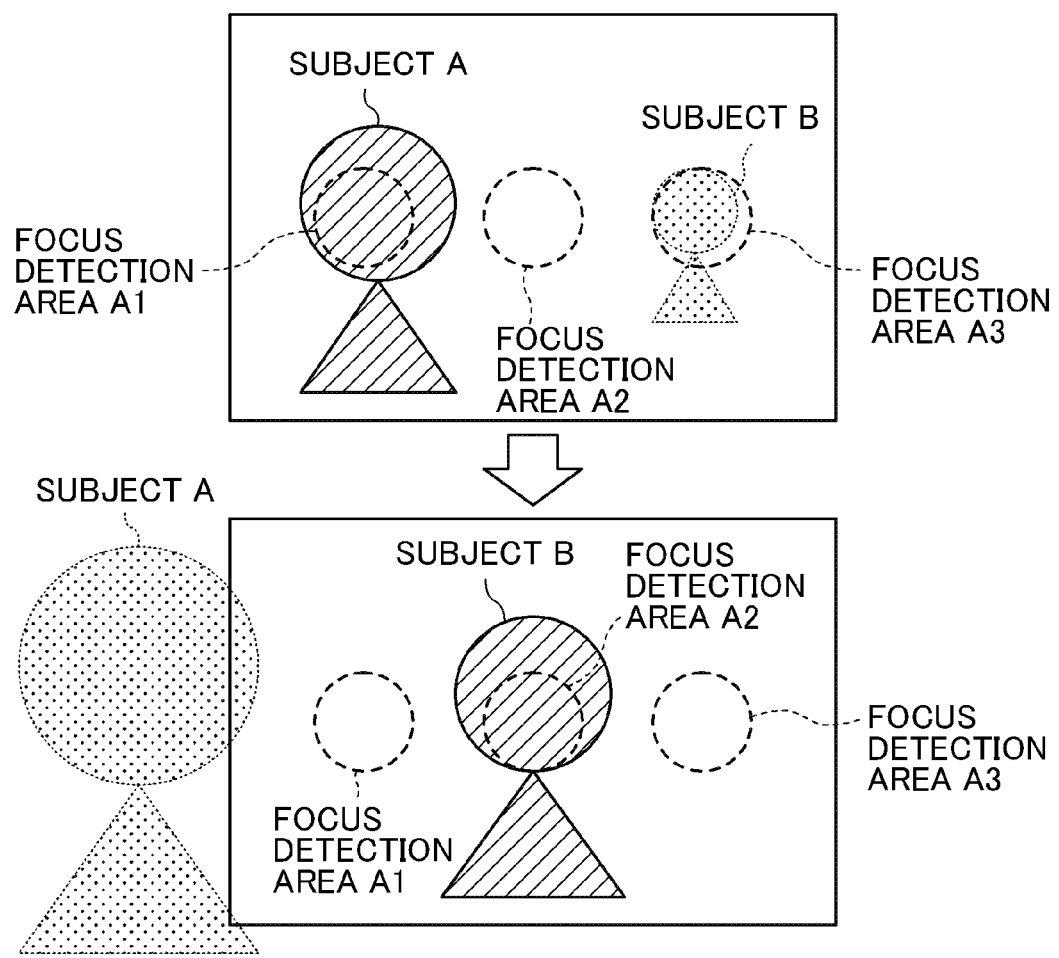
FIG. 14 is a schematic view of an image displayed in the image display section during the third panning control.

Next, the third panning control will be described with reference to FIGS. 13 and 14. The third panning control is different from the first panning control in that the zooming is performed during the panning. FIG. 13 is a flowchart in a case where, while shooting an motion image of FIG. 14, the focus is shifted from a subject A to a subject B in association with the panning, and the zooming is performed so that an image scaling factor is the same between the subject B and the subject A.

Before the focus shift, the subject A is overlapped with the focus detection area A1, and the subject B is overlapped with the focus detection area A3. In addition, the subject A is in focus. Starting from such a state, while the camera 100 is panned so that the subject B moves to the center of the imaging surface, the zooming is performed so that the image scaling factor is the same between the subject A and the subject B. Then, the camera 100 brings the subject B into focus by the focus shift control.

Specifically, flows from a step for operating the focus shift switch 40c (step Se1) to a step for obtaining the defocus information in each of the focus detection areas A1-A3 (step Se3), and to a step for determining the focusing time (step Se11) are similar to the flows according to steps Sc2, Sc3, Sc11 of the first panning control.

At step Se4, the body control section 5 moves the focus lens group 72 to bring the subject A overlapped with the focus detection area A1 currently selected as the focus detection area used for the focusing, into focus. In addition to the foregoing, the body control section 5 calculates the image scaling factor of the subject A based on positions of the focus lens group 72 and the zoom lens group 75. Subsequently, the process proceeds to step Se5.

Step Se5 is similar to step Sc5 of the first panning control. That is, the body control section 5 determines whether or not the photographer selects the subject to be subsequently in focus and a focus detection area expected as a destination of such an subject. When the selection of the subject to be subsequently in focus and the focus detection area expected as the destination is made, the process proceeds to step Se6. On the other hand, when no selection is made, the process returns to step Se3, and steps Se3-Se5 are repeated.

At step Se6, the body control section 5 calculates the moving speed V of the focus lens group 72 in the similar manner to step Sc6 of the first panning control. However, a currently-used value K is a value K in a case where the zoom lens group 75 is moved so that the subject B has an image scaling factor same as the current image scaling factor of the subject A. That is, the moving amount of the focus lens group 72 is obtained, which is required for bringing the subject B into focus after the zooming has been performed so that the image scaling factor of the subject B is the same as the current image scaling factor of the subject A. The body control section 5 calculates the moving speed of the focus lens group 72 based on the moving amount.

Subsequently, at step Se7, the body control section 5 determines whether or not the subject B relatively moves to the focus detection area selected as the destination by panning the camera 100. Such a process is similar to step Sc7 of the first panning control. That is, in the third panning control, the entering of the subject to be subsequently in focus into the focus detection area selected as the destination is the trigger for performing the focus shift, i.e., the condition for shifting focus.

Subsequently, at step Se8, the body control section 5 moves the focus lens group 72 in the defocus direction obtained at step Se3 at the moving speed V calculated at step Se6 for the determined focusing time T. In addition to the foregoing, the body control section 5 moves the zoom lens group 75 so that the image scaling factor of the subject B is the same as that of the subject A before the panning. The moving speed of the zoom lens group 75 is set so that timings of starting and completing the zooming are synchronized with timings of starting and completing the focusing, respectively. Note that the timings of starting and completing the zooming and the timings of starting and completing the focusing are not necessarily synchronized with each other. That is, the timings of starting and completing the zooming may be shifted to timings earlier or later than the timings of starting and completing the focusing. Alternatively, the zooming may be performed after the focusing is completed or before the focusing is started.

Subsequently, the process proceeds to steps Se9, Se10. Steps Se9, Se10 are similar to steps Sc9, Sc10 of the first panning operation.

As in the foregoing, in the third panning control during the panning, the zooming and the focus shift are performed in parallel after the panning is performed. That is, the moving speed of the focus lens group 72 is set considering the moving amount of the focus lens group 72, which is required after the zooming in a configuration in which the zooming is performed in association with the panning. As a result, after a lapse of the predetermined focusing time T since the panning is completed, the zooming has performed so that the image scaling factor of the subject to be subsequently in focus is the same as that of the subject A before the panning, and the focusing for the subject to be subsequently in focus has completed.

Note that the zooming and the focus shift are not necessarily performed in parallel. For example, the focus shift may be performed after the zooming. Alternatively, the zooming may be included in the second panning control. That is, a configuration may be employed, in which the zooming and the focusing are started as soon as the panning is started.

Other Embodiment

The foregoing embodiment may have the following configurations.

The foregoing embodiment is intended for the interchangeable lens type camera, but a configuration similar to that of the foregoing embodiment may be employed for an integrated lens type camera such as a so-called "compact digital camera" and a video camera.

In the foregoing embodiment, the phase difference detection is performed by using light transmitting through the imaging device 10, but the present disclosure is not limited to such a configuration. A configuration may be employed, in which, e.g., a so-called "external light type passive phase difference detection system" is used to detect a phase difference based on a parallax error.

In the foregoing embodiment, the focal point is detected by the phase difference detection in the focusing before the focus shift or in the focus check after the focus shift, but the present disclosure is not limited to such a configuration. That is, the focal point may be detected not only by the phase difference detection but also by the contrast detection, except for a case where the defocus amount of the subject to be subsequently in focus is obtained in order to calculate the moving speed V of the focus lens group 72.

In the foregoing embodiment, the focusing time is set to a constant period of time, but the present disclosure is not limited to such a configuration. For example, a configuration may be employed, in which the focusing time is set by using a function of the defocus amount so that the focusing time is changed depending on the defocus amount. Alternatively, a configuration may be employed, in which the defocus amount is classified as a plurality of levels (i.e., levels corresponding to a small defocus amount, a large defocus amount, a medium defocus amount between the small and large defocus amounts, etc.), and different focusing times corresponding to such levels are set. That is, the focusing is slowly performed when the defocus amount is small, thereby reducing a feeling of restlessness etc. provided to the viewer as compared to a case where the focus lens group 72 moves at a fixed speed (e.g., at the maximum speed). Note that such a configuration does not exclude a case where the focusing is speeded up when the defocus amount is small. As long as the moving speed of the focus lens group 72 is adjusted to adjust the focusing, any settings of the focusing may be selected by the photographer. In such a manner, a motion image which is more suitable for the photographer's purpose for shooting can be shot.

In the foregoing embodiment, the three focus detection areas are provided, but the present disclosure is not limited to such a configuration. For example, sixteen light transmitting portions 17 may be formed in the imaging device 10, and sixteen sets each including the condenser lens 21a, the mask openings 22a, the separator lens 23a, and the line sensor 24a may be provided corresponding to each of the light transmitting portions 17. Note that the number of light transmitting portions 17 and the number of sets each including the condenser lens 21a etc. are not limited to sixteen, and may be set to any numbers. When the number of focus detection areas is small, even if the subject to be subsequently in focus is selected, there is a possibility that the subject is not overlapped with the focus detection area. In such a case, the defocus amount for the subject cannot be detected, and therefore the moving speed V of the focus lens group 72 cannot be calculated. Thus, e.g., the focus detection areas may be displayed in the image display section 44 to request a photographer to select the subject overlapped with the focus detection area. On the other hand, when the number of focus detection areas is large, the subject in the imaging surface is highly likely to be overlapped with any one of the focus detection areas. Thus, the body control section 5 may selects the focus detection area overlapped with a selected subject, and may detect the defocus amount of the subject based on the output from the line sensor 24a corresponding to the focus detection area.

In the foregoing embodiment, the subject and the focus detection area are selected by touching the icon on the touch screen of the image display section 44, but the present disclosure is not limited to such a configuration. For example, selection icons may be displayed in the image display section 44, and an operational switch such as a cross-shaped key switch etc. may be provided in the camera body 4. The photographer may operate the operational switch to move the selection icon in the screen of the image display section 44, and select the target subject or the target focus detection area. In such a case, the image display section 44 forms the display unit, and the operational switch forms an operating unit.

As described above, the present embodiment is useful for the imaging apparatus including the focus detection section configured to detect the defocus amount of the subject by performing the phase difference detection, and particularly for the imaging apparatus by which the motion image can be shot.

The description of the embodiments of the present disclosure is given above for the understanding of the present disclosure. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. An imaging apparatus, comprising:
an imaging device configured to convert light from a subject into an electrical signal by photoelectric conversion and generate an image signal;
a focus detection section configured to, in parallel with receipt of the light from the subject by the imaging device, receive a part of the light from the subject to perform phase difference detection using the light, and detect a defocus amount of the subject;
a focus lens configured to adjust a focus position;
a control section configured to move the focus lens based on the defocus amount detected by the focus detection section to bring the subject into focus; and
a selecting unit for selecting a subject to be in focus from subjects included in an image signal,
wherein the control section is configured to, when a predetermined condition for shifting focus is satisfied, move the focus lens from a state in which a first subject is in focus to bring a second subject, which is the subject selected by the selecting unit, into focus, and adjusts a focusing time from the satisfaction of the condition for shifting focus to the achievement of the focusing depending on the defocus amount detected by the focus detection section when the first subject is in focus before the movement of the focus lens.

2. The imaging apparatus of claim 1, wherein the control section is configured to adjust a moving speed of the focus lens to adjust the focusing time, and adjusts the moving speed of the focus lens so that a smaller defocus amount results in a lower moving speed of the focus lens.

3. The imaging apparatus of claim 1, wherein the control section adjusts the focusing time so that the focusing time is maintained constant.

4. The imaging apparatus of claim 1, wherein
the focus detection section includes a plurality of focus detection areas corresponding to different regions of an imaging surface of the imaging device, receives the part of the light from the subject in the plurality of focus detection areas, and performs the phase difference detection using the light to detect a defocus amount of a subject corresponding to each of the focus detection areas, and the control section adjust the focusing time depending on the defocus amount in the focus detection area corresponding to the subject selected by the selecting unit.

5. The imaging apparatus of claim 1, further comprising:
a display unit configured to display the image signal; and
a touch screen provided on a surface of the display unit,
wherein the selecting unit is the touch screen.

6. The imaging apparatus of claim 1, further comprising:
a display unit configured to display the image signal; and
an operating unit configured to operate a selection icon displayed in the display unit,
wherein the selecting unit is the operating unit and the selection icon displayed in the display unit.

7. The imaging apparatus of claim 1, further comprising:
a zoom lens,
wherein the control section calculates a moving amount of the focus lens, which is required for bringing the subject into focus based on a position of the zoom lens, a position of the focus lens, and the defocus amount detected by the focus detection section, and adjusts the focusing time based on the position of the zoom lens, the position of the focus lens, and the defocus amount.

8. The imaging apparatus of claim 7, wherein the control section is configured to obtain an image scaling factor of the first subject and, when the control section moves the focus lens to bring the second subject into focus, the control section moves the zoom lens so that an image scaling factor of the second subject is the same as the obtained image scaling factor.

9. The imaging apparatus of claim 8, wherein the control section simultaneously moves the zoom lens and the focus lens.

10. An imaging apparatus, comprising:
an imaging device configured to convert light from a subject into an electrical signal by photoelectric conversion and generate an image signal;
a focus detection section configured to, in parallel with receipt of the light from the subject by the imaging device, receive a part of the light from the subject to perform phase difference detection using the light, and detect a defocus amount of the subject;
a focus lens configured to adjust a focus position;
a control section configured to move the focus lens based on the defocus amount detected by the focus detection section to bring the subject into focus; and
a selecting unit for selecting a subject to be in focus from subjects included in an image signal,
wherein the control section is configured to, when a predetermined condition, which includes at least a panning operation, for shifting focus is satisfied, move the focus lens to bring the subject selected by the selecting unit into focus, and adjusts a focusing time from the satisfaction of the condition for shifting focus to the achievement of the focusing depending on the defocus amount detected by the focus detection section before the movement of the focus lens.

11. The imaging apparatus of claim 10, wherein
the focus detection section includes a plurality of focus detection areas corresponding to different regions of an imaging surface of the imaging device, receives the part of the light from the subject in the plurality of focus detection areas, and performs the phase difference detection using the light to detect a defocus amount of a subject corresponding to each of the focus detection areas,
the selecting unit is configured to select one of the focus detection areas, and the condition for shifting focus is that the subject selected by the selecting unit enters, by the panning, the one of the focus detection areas selected by the selecting unit.

12. The imaging apparatus of claim 10, wherein the condition for shifting focus is that the panning is started.

13. The imaging apparatus of claim 10, further comprising:
a zoom lens,
wherein the control section:
  obtains an image scaling factor of a first subject which is in focus before the satisfaction of the condition for shifting focus,
  when the condition for shifting focus is satisfied, moves the focus lens from a state in which the first subject is in focus to bring a second subject, which is the subject selected by the selecting unit, into focus, and moves the zoom lens such that an imaging scaling factor of the second subject is the same as the obtained imaging scaling factor, and
  calculates a moving amount of the focus lens, which is required for bringing the second subject into focus, based on a position of the zoom lens, a position of the focus lens, and the defocus amount detected by the focus detection section, and adjusts the focusing time based on the position of the zoom lens, the position of the focus lens, and the defocus amount.

* * * * *